(12) United States Patent
Sagar et al.

(10) Patent No.: US 10,055,423 B2
(45) Date of Patent: Aug. 21, 2018

(54) INFRASTRUCTURE FOR SYNCHRONIZATION OF MOBILE DEVICE WITH MOBILE CLOUD SERVICE

(71) Applicant: Oracle International Corporation, Redwood Shores, CA (US)

(72) Inventors: Akash Sagar, Redwood City, CA (US); Jeff Hagen, Redwood City, CA (US); Luke Liu, Chicago, IL (US)

(73) Assignee: Oracle International Corporation, Redwood Shores, CA (US)

( * ) Notice: Subject to any disclaimer, the term of this patent is extended or adjusted under 35 U.S.C. 154(b) by 232 days.

(21) Appl. No.: 14/314,729

(22) Filed: Jun. 25, 2014

(65) Prior Publication Data

US 2015/0278245 A1    Oct. 1, 2015

Related U.S. Application Data

(60) Provisional application No. 61/972,900, filed on Mar. 31, 2014.

(51) Int. Cl.
| | |
|---|---|
| *G06F 17/30* | (2006.01) |
| *H04L 29/08* | (2006.01) |
| *H04W 4/00* | (2018.01) |

(52) U.S. Cl.
CPC .. *G06F 17/30174* (2013.01); *G06F 17/30902* (2013.01); *H04L 67/1095* (2013.01);
(Continued)

(58) Field of Classification Search
CPC ......... G06F 17/30174; G06F 17/30902; H04L 67/1095; H04L 67/2823; H04L 67/2852; H04W 4/00
(Continued)

(56) References Cited

U.S. PATENT DOCUMENTS

| | | | |
|---|---|---|---|
| 6,751,671 B1 | 6/2004 | Urien | |
| 6,970,935 B1 | 11/2005 | Maes | |

(Continued)

FOREIGN PATENT DOCUMENTS

| | | |
|---|---|---|
| CA | 1271827 | 7/1990 |
| EP | 1569112 | 8/2005 |

(Continued)

OTHER PUBLICATIONS

Tang, Longji et al, "Enterprise Mobile Service Architecture: Challenges and Approaches", Dec. 2013, Service Technology Magazine, Issue LXXIX, pp. 1-43.*

(Continued)

*Primary Examiner* — Pierre Vital
*Assistant Examiner* — Alicia Antoine
(74) *Attorney, Agent, or Firm* — Kilpatrick Townsend & Stockton LLP

(57) ABSTRACT

Techniques are described for implementing a cloud computer system (e.g., "a cloud service") for facilitating the synchronization of enterprise data between mobile computing devices and enterprise computing systems (e.g., human resource management systems, business management systems, or the like). The cloud service may convert enterprise data received from different enterprise computing systems to a format that can be managed and updated easily by mobile computing devices. The converted format may enable distinct information to be easily identified. The enterprise data may be associated with policy information and version information to manage synchronization of the enterprise data. In some embodiments, the cloud service may manage synchronization with mobile computing devices based on classification of a communication connection the mobile computing devices have to a wireless network. The communication connection may be used to determine a manner (Continued)

for synchronizing enterprise data between the mobile computing devices and the cloud computer system.

16 Claims, 10 Drawing Sheets

(52) U.S. Cl.
CPC ...... *H04L 67/2823* (2013.01); *H04L 67/2852* (2013.01); *H04W 4/00* (2013.01)

(58) Field of Classification Search
USPC .......................................................... 707/610
See application file for complete search history.

(56) References Cited

U.S. PATENT DOCUMENTS

| | | | |
|---|---|---|---|
| 7,430,290 | B2 | 9/2008 | Zhu |
| 8,504,837 | B2 | 8/2013 | Jasper et al. |
| 9,043,600 | B2 | 5/2015 | Jasper et al. |
| 2003/0187631 | A1 | 10/2003 | Masushige et al. |
| 2004/0107196 | A1 | 6/2004 | Chen et al. |
| 2004/0162823 | A1 | 8/2004 | van de Loo et al. |
| 2006/0112127 | A1 | 5/2006 | Krause et al. |
| 2006/0206348 | A1 | 9/2006 | Chen et al. |
| 2008/0010676 | A1 | 1/2008 | Dosa Racz et al. |
| 2009/0158302 | A1 | 6/2009 | Nicodemus et al. |
| 2009/0170557 | A1 | 7/2009 | Chauhan et al. |
| 2011/0252147 | A1* | 10/2011 | Ewe .................. G06F 17/30893 709/227 |
| 2011/0307547 | A1 | 12/2011 | Backer et al. |
| 2012/0109902 | A1 | 5/2012 | Rozensztejn et al. |
| 2012/0155470 | A1 | 6/2012 | McNamee et al. |
| 2012/0158872 | A1 | 6/2012 | McNamee et al. |
| 2012/0158993 | A1 | 6/2012 | McNamee et al. |
| 2012/0158994 | A1 | 6/2012 | McNamee et al. |
| 2012/0158995 | A1 | 6/2012 | McNamee et al. |
| 2012/0176968 | A1 | 7/2012 | Luna |
| 2013/0055256 | A1 | 2/2013 | Banga et al. |
| 2013/0086210 | A1 | 4/2013 | Yiu et al. |
| 2013/0086211 | A1 | 4/2013 | Sondhi et al. |
| 2013/0110778 | A1 | 5/2013 | Taylor et al. |
| 2013/0174154 | A1 | 7/2013 | Poore et al. |
| 2013/0219176 | A1 | 8/2013 | Akella et al. |
| 2013/0227636 | A1* | 8/2013 | Bettini .................. G06F 21/568 726/1 |
| 2013/0239192 | A1* | 9/2013 | Linga ...................... G06F 21/44 726/7 |
| 2013/0275492 | A1 | 10/2013 | Kaufman et al. |
| 2013/0297662 | A1* | 11/2013 | Sharma ............. G06F 17/30233 707/827 |
| 2014/0025832 | A1 | 1/2014 | Ito |
| 2014/0040977 | A1* | 2/2014 | Barton .................. G06F 21/604 726/1 |
| 2014/0096186 | A1* | 4/2014 | Barton .................... H04L 67/10 726/1 |
| 2014/0108665 | A1* | 4/2014 | Arora .................... G06F 9/5077 709/227 |
| 2014/0181864 | A1 | 6/2014 | Marshall et al. |
| 2014/0295821 | A1* | 10/2014 | Qureshi .................. H04L 43/04 455/419 |
| 2014/0304326 | A1* | 10/2014 | Wesley .................. G06F 9/4445 709/203 |
| 2014/0321302 | A1* | 10/2014 | Fan .................... H04W 52/0277 370/252 |
| 2014/0379648 | A1* | 12/2014 | Chiu ................. G06F 17/30174 707/624 |
| 2015/0082385 | A1 | 3/2015 | Maria |
| 2015/0130365 | A1 | 5/2015 | Kim et al. |
| 2015/0227405 | A1 | 8/2015 | Jan et al. |
| 2015/0227406 | A1 | 8/2015 | Jan et al. |
| 2015/0229638 | A1 | 8/2015 | Loo |
| 2015/0229645 | A1 | 8/2015 | Keith et al. |
| 2015/0256603 | A1* | 9/2015 | Pillai ....................... G06F 9/541 709/246 |

FOREIGN PATENT DOCUMENTS

| | | |
|---|---|---|
| EP | 2849061 | 3/2015 |
| WO | 2013071087 | 5/2013 |
| WO | 2013086211 | 6/2013 |
| WO | 2013126570 | 8/2013 |
| WO | 2015038225 | 3/2015 |
| WO | 2015042547 | 3/2015 |
| WO | 2015050568 | 4/2015 |
| WO | 2015119529 | 8/2015 |
| WO | 2015119658 | 8/2015 |
| WO | 2015119659 | 8/2015 |
| WO | 2015152956 | 10/2015 |

OTHER PUBLICATIONS

Booking and Paying for Your Holiday—Holidays FAQs, et2holidays.com, Copyright Jet2holidays.com, 2002-2014, a subsidiary of Dart Group PLC, Retrieved from the Internet: <URL: http://www.jet2holidays.com/faqs-essential-info2.aspx>, 2002-2014, 2 pages.

Disney FastPass+, AllEars.Net, R.Y.I. Copyright Enterprises, LLC, Retrieved from the Internet: <URL: http://allears.net/tp/ fastpass-plus.htm>, 1999-2014, 4 pages.

Dispersed Virtual Queue Management, tensabarrieronline.com, Tensabarrieronline-Tamis Corporation, Retrieved from the Internet: <URL: http://www.tensabarrieronline.com/shop/dispersed-virtual-queue-management!>, Copyright 2014, 2 pages.

Electronic Queuing—QtracVR Virtual Queuing System, lavi.com, Lavi Industries, Retrieved from the Internet: <URL: http://www.lavi.com/electronic-queuing/virtual-queuing.aspx>, Copyright 2014, 2 pages.

Electronic Ticket System—Queue Management without Lines, queuesolutions.com, Copyright 2013 Queue Solutions, Inc., Retrieved from the Internet: <URL: http://queuesolutions.com/electronic-ticketsystem.php>, 2012, 2 pages.

eQTM Virtual Queuing, tensator.com, Copyright Tensator, Retrieved from the Internet: <URL: http://www.tensator.com/us/showroom/eq-virtual-queuing.aspx>, 1 page.

NEMO-Q Virtual Queuing, NEMO-Q.com, retrieved from the Internet: <URL: http://www.nemoq.com/virtual_queuing_ systems.html>, Copyright 2014, 3 pages.

Queuing at busy check-in counters is now a thing of the past, thanks to our online "self check-in" system, airnamibia.com, Air Namibia, Retrieved from the Internet: <URL: http://www.airnamibia.com/planbook/check-in-online/>, 2 pages.

VirtuaQ: Virtual Queue Management System, esco.com.sg, Copyright 2012, Esco Pte. Ltd., <URL: http://www.esco.com.sg/development-and-mobility/virtuaq/>, 2012, 3 pages.

Web Check-in—Bangkok Airways, bangkokair.com, Bangkok Airways, Retrieved from the Internet: <URL: http://www.bangkokair.com/pages/view/web-check-in>, 2 pages.

Chanliau, Oracle Enterprise Gateway:Securing SOA and Web Services with Oracle Enterprise Gateway, retrieved from the Internet:URL:http://www.oracle.comjtechnetwork/middleware/id-mgmtjoeg-tech-wp-apr-2011-345875.pdf, Apr. 30, 2011, 22 pages.

Facemire et al., Cloud Mobile Development: Enabled by Back-End-As-A-Service, Mobile's New Middleware, Aug. 30, 2012, 15 pages.

Keating, Cloud-based setup reduces wait-times at government offices (with related video), American City & County, Retrieved from the Internet: <URL: http://americancityandcounty.com/telecommunications/cloud-based-setup-reduces-wait-timesgovernment-offices-related-video>, May 5, 2014, 4 pages.

Lawson, House of Fraser trials virtual queue system for online collection, Retail Week [online]. EMAP Publishing Limited, Retrieved from the Internet: <URL: http://www.retailweek.com/companies/house-of-fraser/house-of-fraser-trials-virtual-queue-systemfor-online-collection/5052769.article>, Sep. 6, 2013, 3 pages.

Ponge, Fork and Join: Java can excel at painless parallel programming too!. Oracle Technology Network, (retrieved on Sep. 15,

(56) References Cited

OTHER PUBLICATIONS

2014], retrieved from the internet: <URL: http://www.oracle.com/technetwork/articles/java/fork-join-422606.html>, Jul. 2011, 7 pages.
Ponge, Scenarios for using Oracle Nashorn as a command-line tool and as an embedded interpreter in Java applications, Oracle Technology Network [online], (retrieved on Sep. 15, 2014], retrieved from the internet: <URL: http://www.oracle.com/technetwork/articles/java/jf14-nashorn-2126515.html>, 8 pages.
Woods, Oracle Unveils Project Avatar at JavaOne, InfoQ.com, Sep. 27, 2013, [online], [retrieved on Sep. 15, 2014], retrieved from the internet :<URL: http://www.infoq.com/news/2013/09/oracle-unveils-avatar>, Sep. 27, 2013, 9 pages.
International Application No. PCT/RU2014/000677, International Search Report and Written Opinion dated Feb. 19, 2015, 13 pages.
International Application No. PCT/US2014/053747, International Search Report and Written Opinion dated Nov. 25, 2014, 17 pages.
International Application No. PCT/US2014/056154, International Search Report and Written Opinion dated Dec. 5, 2014, 12 pages.
U.S. Appl. No. 14/475,285, Notice of Allowance dated Aug. 24, 2015, 17 pages.
PCT/US2014/044165, "International Preliminary Report on Patentability", dated Mar. 14, 2016, 25 pages.
International Search Report and Written Opinion dated Nov. 11, 2014 for Int'l Patent Application No. PCT/US2014/044165, 9 pages.

\* cited by examiner

INFRASTRUCTURE FOR SYNCHRONIZATION OF MOBILE DEVICE WITH MOBILE CLOUD SERVICE

CROSS-REFERENCES TO RELATED APPLICATIONS

The present application claims priority and benefit from U.S. Provisional Application No. 61/972,900, filed Mar. 31, 2014, entitled "INFRASTRUCTURE FOR SYNCHRONIZATION OF MOBILE DEVICE WITH MOBILE CLOUD SERVICE," the entire contents of which are incorporated herein by reference for all intents and purposes.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to techniques for synchronizing enterprise data between mobile computing devices and enterprise computing systems.

BACKGROUND

Mobile device applications, commonly referred to as "apps," are a ubiquitous presence on smart phones and other electronic mobile communication devices. With the advent of the Apple iPhone in January 2007, apps became a normal part of users' day-to-day experiences with their mobile devices. There is a wide variety of apps targeted for consumers' and business' smart phones that include email management, web connection, and social media interaction.

Many mobile apps rely upon a consistent wireless connection between the mobile device and Internet networks. When the connection is strong, the apps upload and download data as designed. When the connection is weak or nonexistent, the apps often present error messages, such as "unable to connect to server," to users. A user may wait expecting that at some point, the mobile device will connect again to the network and that the app will continued uploading or downloading.

For many apps, a temporary halt in wireless connection is nothing more than a nuisance. The task of uploading or downloading can simply be performed when the connection is reestablished. For example, in an email app, incoming messages can be downloaded and outgoing messages can be uploaded when the device enters an area with better signal coverage. For other apps, such as those which 'lock' items when checked out from a database, the problem affects more than the user on the mobile device. For example, a user on a mobile device who is editing a contact in a server-based contact list may lock out other users from editing the same contact when the user's mobile device goes out of range.

Depending on a type of app or the type of data used by apps, the apps may need to connect and synchronize with different back-end enterprise systems. The different back-end enterprise systems may vary for the application and the type of data. As such, different back-end enterprise systems may use different communication protocols and mechanisms to communicate data to devices. Devices such as mobile computing devices may have limited computing resources and/or communication connections to maintain synchronization of data with back-end systems. Further, mobile computing devices may not be aware of configurations or formats of data provided by different back-end systems. As such, mobile computing devices may encounter challenges for synchronizing data with back-end systems.

BRIEF SUMMARY

Techniques are described for synchronizing enterprise data between mobile computing devices and enterprise computing systems (e.g., human resource management systems, customer relationship management systems, business management systems, or the like). In certain embodiments, a cloud computer system (e.g., "a cloud service") may be implemented to facilitate synchronization of enterprise data between different types of enterprise computing systems and mobile computing devices. The cloud service may convert enterprise data received from different enterprise computing systems to a format that can be managed and updated easily by mobile computing devices. The converted format may enable distinct information to be easily identified. The enterprise data may be associated with policy information and version information to manage synchronization of the enterprise data. In some embodiments, the cloud service may manage synchronization with mobile computing devices based on classification of a communication connection the mobile computing devices have to a wireless network. The communication connection may be used to determine a manner for synchronizing enterprise data between mobile computing devices and the cloud computer system.

The cloud service may operate as an intermediary computing system between mobile computing devices and enterprise computing systems. In certain embodiments, a cloud service may be located in a different geographical location than mobile computing devices and enterprise computing systems. A cloud service may communicate with enterprise computing systems via networks that provide high speed communication. A reliable high speed communication connection with enterprise computing systems may enable the cloud service to maintain regular communication for synchronization of enterprise data as needed. By doing so, the cloud service can maintain a current version of synchronized enterprise data with respect to any enterprise computing systems.

In certain embodiments, the cloud service may convert enterprise data from a specific format supported by an enterprise computing system to a standard format, e.g., JavaScript Object Notation (JSON) that can be easily parsed by different applications and different mobile computing devices. The enterprise data may be converted back to a specific format of an enterprise computing system for synchronization with the specific enterprise computing system. Using a common format may enable applications to be designed in a consistent manner using such a format without having to address differences between enterprise computing systems.

In certain embodiments, the cloud service may improve synchronization by identifying certain type of information in enterprise data. The cloud service may identify distinct pieces of information in enterprise data, such as items and binary large objects (BLOBs). Items may be associated with a collection (e.g., a group of related items). A BLOB may include a collection of binary data stored as a single entity in a database management system, such as an image, multimedia object, or executable code, or as otherwise known in the art. Enterprise data formatted to a standard format for mobile computing devices may distinguish between the types of information. In doing so, the cloud service may manage synchronization of enterprise data with respect to changes in a distinct portion of enterprise data corresponding to each identifiable type of information. A cloud service may identify relationships between items such that duplicate enterprise data between collections may be reduced during for communication to mobile computing devices.

In certain embodiments, the cloud service and mobile computing devices may manage enterprise data through use of policies associated with enterprise data corresponding to items, collections, and blobs. The policies may be received from enterprise computing systems with enterprise data. The policies may indicate criteria to storing enterprise data. In some embodiments, the criteria may correspond to classification of a communication connection (e.g., a type of connection, a data transfer rate of a connection, or the like) from a mobile computing device to a wireless network. The classification may be used to determine when to update enterprise data and how to do so with respect to distinct information identified in the enterprise data. In some embodiments, the cloud service may manage synchronization with mobile computing devices using version information. In some instances, a communication connection to a wireless network may change. Managing synchronization based on policies enables mobile computing devices to account for changes in a communication connection from a mobile computing device to a wireless network.

According to at least one example, techniques may be provided for synchronizing enterprise data between mobile computing devices and enterprise computing systems. Such techniques may be implemented by a computer system (e.g., a mobile computing system) or a computing device (e.g., a mobile computing device). The computer system may include one or more processors and one or more memory devices coupled with and readable by one or more processors. The one or more memory devices may store a set of instructions which, when executed by the one or more processors, cause the one or more processors to perform the techniques disclosed herein. The techniques can include a computer-implemented method, which includes receiving, via a wireless communication connection to a network, enterprise data for an application configured for execution on the mobile computing device. The received enterprise data may be structured in a JSON format. The enterprise data is structured in a first format that has been converted from original enterprise data structured in a second format. The method further includes storing the enterprise data to a cache on the mobile computing device. The method further includes determining a current communication status of the wireless communication connection. The method further includes identifying an existence of a plurality of items in the enterprise data based on the first format. The method further includes determining policy information for the enterprise data. The policy information indicates criteria for updating each item of the plurality of items. The criteria are based at least in part on a communication status of a communication connection. The method further includes identifying, using the policy information, an item in the plurality of items in the enterprise data to update based on the current communication status. The method further includes sending, via the wireless communication connection, a request for updated enterprise data corresponding to the identified item. The method further includes receiving the updated enterprise data for the identified item. The method further includes updating the cache with the updated enterprise data for the identified item.

In certain embodiments of the invention, the enterprise data is received from an enterprise server through a cloud computer system. The enterprise data may be structured in a format when it is received. The format may be based on conversion of the enterprise data structured in a representation state transfer (REST) format.

In certain embodiments, an item in the enterprise data includes a uniform resource identifier. The uniform resource identifier may indicate a location of information about the item.

In certain embodiments, the enterprise data includes a first collection of items and a second collection of items. The first collection of items and the second collection of items may include a first item.

In certain embodiments, enterprise data includes information indicating whether the enterprise data includes an item, a collection of items, or a blob.

In certain embodiments, the current communication status is based on a data transfer rate of the wireless communication connection between the mobile computing device and the network.

In certain embodiments, the request indicates version information associated with the identified item. The updated enterprise data may be determined based on the version information.

In certain embodiments, the enterprise data includes items. The policy may indicate a time period for storing the items in the cache. The time period may be based on content included in the items.

In certain embodiments, the enterprise data stored in the cache includes items. The policy may indicate a time period for updating each of the items.

According to at least one example, techniques may be provided for synchronizing enterprise data between mobile computing devices and enterprise computing systems. Such techniques may be implemented by a computer system (e.g., a cloud computer system) or a computing device (e.g., a cloud computer server). The computer system may include one or more processors and one or more memory devices coupled with and readable by one or more processors. The one or more memory devices may store a set of instructions which, when executed by the one or more processors, cause the one or more processors to perform the techniques disclosed herein. The techniques can include a computer-implemented method, which includes receiving enterprise data from an enterprise computing system via a network communication connection using a first communication protocol. The enterprise data is structured in a first format for the enterprise computing system. The computer system and the enterprise computing system are located at different geographical locations. The method further includes determining that the data includes a plurality of items and policy information associated with the plurality of items. The method further includes converting the enterprise data structured in the first format to a second format. The second format is parsable by mobile computing devices to identify enterprise data corresponding to each item of the plurality of items and to identify policy information corresponding to each item. The method further includes sending the converted enterprise data structured in the second format to a plurality of mobile computing devices via a wireless network using a second communication protocol.

In certain embodiments, the first communication protocol is a representation state transfer (REST) protocol and the second communication protocol is different from the first communication protocol.

In certain embodiments, the enterprise data structured in the first format is in a REST format.

In certain embodiments, the method further includes storing an identifier in enterprise data corresponding to each of the items. The identifier may identify the item.

In certain embodiments, the method further includes: identifying at least two collection of items in the plurality of items; determining that an item is included in at least two collection of items. Converting the enterprise data from the first format to the second format may include inserting additional information to the enterprise data that is converted. The addition information may identify each collection of items.

According to at least one example, a mobile computing device may be provided for synchronizing enterprise data with enterprise computing systems. The mobile computing device may comprise: a first receiving unit configured to receive, via a wireless communication connection to a network, enterprise data for an application configured for execution on the mobile computing device, wherein the enterprise data is structured in a first format that has been converted from original enterprise data structured in a second format; a storing unit configured to store the enterprise data to a cache on the mobile computing device; a first determining unit configured to determine a current communication status of the wireless communication connection; a first identifying unit configured to identify an existence of a plurality of items in the enterprise data based on the first format; a second determining unit configured to determine policy information for the enterprise data, wherein the policy information indicates criteria for updating each item of the plurality of items, and wherein the criteria are based at least in part on a communication status of a communication connection; a second identifying unit configured to identify, using the policy information, an item in the plurality of items in the enterprise data to update based on the current communication status; a sending unit configured to send, via the wireless communication connection, a request for updated enterprise data corresponding to the identified item; a second receiving unit configured to receive the updated enterprise data for the identified item; and an updating unit configured to update the cache with the updated enterprise data for the identified item. In one embodiment, the received enterprise data is structured in a JavaScript Object Notation format. In one embodiment, the enterprise data is received from an enterprise server through a cloud computer system; the enterprise data is structured in a format when it is received; and the format is based on conversion of the enterprise data structured in a representation state transfer (REST) format. In one embodiment, an item in the enterprise data includes a uniform resource identifier, and the uniform resource identifier indicates a location of information about the item. In one embodiment, the enterprise data includes a first collection of items and a second collection of items, and the first collection of items and the second collection of items include a first item. In one embodiment, the enterprise data includes information indicating whether the enterprise data includes an item, a collection of items, or a blob. In one embodiment, the current communication status is based on a data transfer rate of the wireless communication connection between the mobile computing device and the network. In one embodiment, the request indicates version information associated with the identified item, and the updated enterprise data is determined based on the version information. In one embodiment, the enterprise data includes items; the policy indicates a time period for storing the items in the cache; and the time period is based on content included in the items. In one embodiment, the enterprise data stored in the cache includes items, and the policy indicates a time period for updating each of the items.

According to at least one example, an apparatus may be provided for synchronizing enterprise data between mobile computing devices and enterprise computing systems. The apparatus may comprise: means for receiving, by a mobile computing device, via a wireless communication connection to a network, enterprise data for an application configured for execution on the mobile computing device, wherein the enterprise data is structured in a first format that has been converted from original enterprise data structured in a second format; means for storing, by the mobile computing device, the enterprise data to a cache on the mobile computing device; means for determining, by the mobile computing device, a current communication status of the wireless communication connection; means for identifying, by the mobile computing device, an existence of a plurality of items in the enterprise data based on the first format; means for determining, by the mobile computing device, policy information for the enterprise data, wherein the policy information indicates criteria for updating each item of the plurality of items, and wherein the criteria are based at least in part on a communication status of a communication connection; means for identifying, using the policy information, by the mobile computing device, an item in the plurality of items in the enterprise data to update based on the current communication status; means for sending, by the mobile computing device, via the wireless communication connection, a request for updated enterprise data corresponding to the identified item; means for receiving, by the mobile computing device, the updated enterprise data for the identified item; and means for updating, by the mobile computing device, the cache with the updated enterprise data for the identified item. In one embodiment, the received enterprise data is structured in a JavaScript Object Notation format. In one embodiment, the enterprise data is received from an enterprise server through a cloud computer system; the enterprise data is structured in a format when it is received; and the format is based on conversion of the enterprise data structured in a representation state transfer (REST) format. In one embodiment, an item in the enterprise data includes a uniform resource identifier, and the uniform resource identifier indicates a location of information about the item. In one embodiment, the enterprise data includes a first collection of items and a second collection of items, and the first collection of items and the second collection of items include a first item. In one embodiment, the enterprise data includes information indicating whether the enterprise data includes an item, a collection of items, or a blob. In one embodiment, the current communication status is based on a data transfer rate of the wireless communication connection between the mobile computing device and the network. In one embodiment, the request indicates version information associated with the identified item, and the updated enterprise data is determined based on the version information. In one embodiment, the enterprise data includes items; the policy indicates a time period for storing the items in the cache; and the time period is based on content included in the items. In one embodiment, the enterprise data stored in the cache includes items, and the policy indicates a time period for updating each of the items.

According to at least one example, a cloud computer system is provided for synchronizing enterprise data between mobile computing devices and enterprise computing systems. The cloud computer system may comprise: a receiving unit configured to receive enterprise data from an enterprise computing system via a network communication connection using a first communication protocol, wherein the enterprise data is structured in a first format for the enterprise computing system, and wherein the cloud computer system and the enterprise computing system are located at different geographical locations; a first determining unit configured to determine that the enterprise data includes a plurality of items and policy information associated with the plurality of items; a converting unit configured to convert the enterprise data structured in the first format to a second format, wherein the second format is parsable by mobile computing devices to identify enterprise data corresponding to each item of the plurality of items and to identify policy information corresponding to each item; and a sending unit configured to send the converted enterprise data structured in the second format to a plurality of mobile computing devices via a wireless network using a second communication protocol. In one embodiment, the first communication protocol is a representation state transfer (REST) protocol, and the second communication protocol is different from the first communication protocol. In one embodiment, the enterprise data structured in the first format is in a representation state transfer (REST) format. In one embodiment, the cloud computer system further comprises: a storing unit configured to store an identifier in enterprise data corresponding to each of the items, wherein the identifier identifies the item. In one embodiment, the cloud computer system further comprises: an identifying unit configured to identify at least two collection of items in the plurality of items; a second determining unit configured to determine that an item is included in at least two collection of items; and wherein converting the enterprise data from the first format to the second format includes inserting additional information to the enterprise data that is converted, and wherein the addition information identifies each collection of items.

According to at least one example, an apparatus is provided for synchronizing enterprise data between mobile computing devices and enterprise computing systems. The apparatus may comprise: means for receiving, by a cloud computer system, enterprise data from an enterprise computing system via a network communication connection using a first communication protocol, wherein the enterprise data is structured in a first format for the enterprise computing system, and wherein the cloud computer system and the enterprise computing system are located at different geographical locations; means for determining, by the cloud computer system, that the enterprise data includes a plurality of items and policy information associated with the plurality of items; means for converting, by the cloud computer system, the enterprise data structured in the first format to a second format, wherein the second format is parsable by mobile computing devices to identify enterprise data corresponding to each item of the plurality of items and to identify policy information corresponding to each item; and means for sending, by the cloud computer system, the converted enterprise data structured in the second format to a plurality of mobile computing devices via a wireless network using a second communication protocol. In one embodiment, the first communication protocol is a representation state transfer (REST) protocol, and the second communication protocol is different from the first communication protocol. In one embodiment, the enterprise data structured in the first format is in a representation state transfer (REST) format. In one embodiment, the apparatus further comprises: means for storing an identifier in enterprise data corresponding to each of the items, wherein the identifier identifies the item. In one embodiment, the apparatus further comprises: means for identifying at least two collection of items in the plurality of items; means for determining that an item is included in at least two collection of items; and wherein converting the enterprise data from the first format to the second format includes inserting additional information to the enterprise data that is converted, and wherein the addition information identifies each collection of items.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The following detailed description together with the accompanying drawings will provide a better understanding of the nature and advantages of the present invention.

BRIEF DESCRIPTION OF THE DRAWINGS

Illustrative embodiments of the present invention are described in detail below with reference to the following drawing figures.

DETAILED DESCRIPTION

Figure 1:
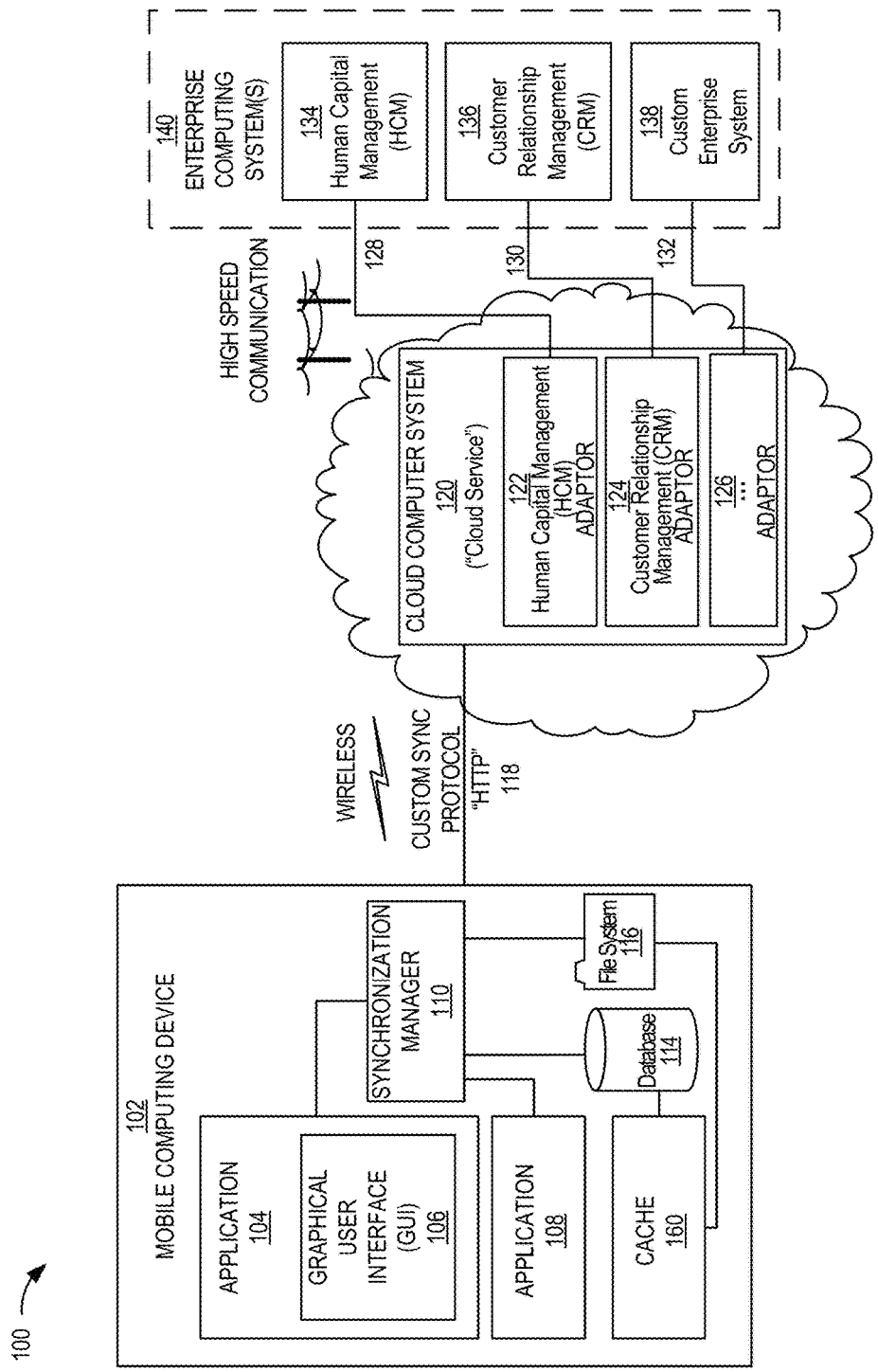
FIG. 1 shows a block diagram of a computer system for synchronizing enterprise data between enterprise computing systems and a mobile computing device according to some embodiments of the present invention.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computer system.

Techniques are described for synchronizing enterprise data between mobile computing devices and enterprise computing systems (e.g., human resource management systems, customer relationship management systems, business management systems, or the like). In certain embodiments, a cloud computer system (e.g., "a cloud service") may be implemented to facilitate synchronization of enterprise data between different types of enterprise computing systems and mobile computing devices. The cloud service may convert enterprise data received from different enterprise computing systems to a format that can be managed and updated easily by mobile computing devices. The converted format may enable distinct information to be easily identified. The enterprise data may be associated with policy information and version information to manage synchronization of the enterprise data. In some embodiments, the cloud service may manage synchronization with mobile computing devices based on classification of a communication connection the mobile computing devices have to a wireless network. The communication connection may be used to determine a manner for synchronizing enterprise data between mobile computing devices and the cloud computer system.

The cloud service may operate as an intermediary computing system between mobile computing devices and enterprise computing systems. In certain embodiments, the cloud service may be located in a different geographical location than mobile computing devices and enterprise computing systems. The cloud service may communicate with enterprise computing systems via networks that provide a high speed communication. A reliable high speed communication connection with enterprise computing systems may enable the cloud service to maintain regular communication for synchronization of enterprise data as needed. By doing so, the cloud service can maintain a current version of synchronized enterprise data with respect to any enterprise computing systems.

In certain embodiments, the cloud service may convert enterprise data from a specific format supported by an enterprise computing system to a standard format, e.g., JavaScript Object Notation (JSON) that can be easily parsed by different applications and different mobile computing devices. The enterprise data may be converted back to a specific format of an enterprise computing system for synchronization with the specific enterprise computing system. Using a common format may enable applications to be designed in a consistent manner using such a format without having to address differences between enterprise computing systems.

In certain embodiments, the cloud service may improve synchronization by identifying certain type of information in enterprise data. The cloud service may identify distinct pieces of information in enterprise data such as items and binary large objects (BLOBs). Items may be associated with a collection (e.g., a group of related items). A BLOB may include a collection of binary data stored as a single entity in a database management system, such as an image, multimedia object, or executable code, or as otherwise known in the art. Enterprise data formatted to a standard format for mobile computing devices may distinguish between the types of information. In doing so, the cloud service may manage synchronization of enterprise data with respect to changes in a distinct portion of enterprise data corresponding to each identifiable type of information. The cloud service may identify relationships between items such that duplicate enterprise data between collections may be reduced during for communication to mobile computing devices.

In certain embodiments, the cloud service and mobile computing devices may manage enterprise data through use of policies associated with enterprise data corresponding to items, collections, and blobs. The policies may be received from enterprise computing systems with enterprise data. The policies may indicate criteria to storing enterprise data. In some embodiments, the criteria may correspond to classification of a communication connection (e.g., a type of connection, a data transfer rate of a connection, or the like) from a mobile computing device to a wireless network. The classification may be used to determine when to update enterprise data and how to do so with respect to distinct information identified in the enterprise data. In some embodiments, the cloud service may manage synchronization with mobile computing devices using version information. In some instances, a communication connection to a wireless network may change. Managing synchronization based on policies enables mobile computing device to account for changes in a communication connection from a mobile computing device to a wireless network.

FIG. 1 shows a block diagram of a computer system 100 for synchronizing enterprise data between enterprise computing systems and a mobile computing device according to some embodiments of the present invention. For purposes of illustration, various examples are provided herein to describe techniques for synchronizing enterprise data between one or more enterprise computing systems, e.g., enterprise computing systems 140, and one or more mobile computing devices, e.g., a mobile computing device 102. In certain embodiments, computer system 100 may include cloud computer system 120 (referred to herein as a "Cloud Service") for managing and facilitating communications between mobile computing devices and enterprise computing systems. Generally, cloud computer system 120 may facilitate synchronization of data between any two endpoint devices in a computing environment. An endpoint device may include a computing device that operates as a user endpoint in a computing system (e.g., a distributed computing system).

In certain embodiments, enterprise computing systems 140 may include computing systems that operate for an enterprise. Enterprise computing systems 140 may include applications and/or services that use enterprise data. For example, enterprise computing systems 140 may provide enterprise services and/or applications for customer relationship management, human capital management, human resource management, supply chain management, enterprise communication systems, email communication systems, or other business services, or combinations thereof. In the example shown in FIG. 1, enterprise computing systems 140 include a human capital management system (HCM) 134, a customer relationship management (CRM) system, a customer enterprise system 138, or combinations thereof.

Enterprise data as described herein may include data received from an enterprise computing system, data sent to an enterprise computing system, data processed by an enterprise computing system, or combinations thereof. The enterprise data may be distinguishable from data for consumer applications and/or services. In some embodiments, For example, enterprise data may change based on application or use of the enterprise data, whereas data for consumer applications (e.g., consumer data) may remain static through use. In certain embodiments, enterprise data may include or be associated with rules that indicate criteria for storing, using, and/or managing the enterprise data. For example, enterprise data may be associated with policy information that indicates one or more policies for storing, using, and/or managing the enterprise data. In certain embodiments, policy information may be included in enterprise data. In certain embodiments, enterprise data may include data processed, stored, used, or communicated by an application or a service executing in an enterprise computing system. For example, enterprise data may include business data (e.g., business objects) such as JSON formatted data from enterprise applications, structured data (e.g., key value pairs), unstructured data (e.g., internal data processed or used by an application, data in JSON format, social posts, conversation streams, activity feeds, etc.), binary large objects (BLOBs), documents, system folders (e.g., application related folders in a sandbox environment), data using representational state transfer (REST) techniques (referred to herein as "RESTful data") (e.g., synchronization data made available by REST endpoints), system data, configuration data, synchronization data, or combinations thereof. In some embodiments, enterprise data may include REST-formatted enterprise data. REST-formatted enterprise data may include RESTful data. REST-formatted data may include data formatted according to REST techniques implemented by an enterprise computing system. Configuration or synchronization data may include data used for synchronization of enterprise data, such as versions, history, integration data, etc. Documents in enterprise data may include extended markup language (XML) files, visual assets, configuration files, media assets, etc. A BLOB may include a collection of binary data stored as a single entity in a database management system, such as an image, multimedia object, or executable code, or as otherwise known in the art.

Through cloud computer system 120, mobile computing devices (e.g., mobile computing device 102) may communicate with multiple enterprise computing systems (e.g., HCM 134, CRM 136, or custom enterprise computing system 138) to exchange enterprise data. Cloud computer system 120 may operate as an intermediary computing environment, which may facilitate communications of enterprise data between mobile computing devices and any of enterprise computing systems 140. Cloud computer system 120 may communicate with different types of computing devices, including different mobile computing devices. Mobile computing device 102 may communicate with cloud computer system 120 through a synchronization manager 110 that handles requests from an application for enterprise data. Synchronization manager 110 may include an application programming interface (API) that applications can extend to control synchronization operations. Using the synchronization manager 110, mobile computing devices can communicate with enterprise computing systems through cloud computer system 120 regardless of a type of computing environment and/or applications executing on mobile computing device 120. Synchronization manager 110 may enable mobile computing device 102 to request and receive enterprise data in a structured format that is processable and readable by the mobile computing devices. Cloud computer system 120 facilitates synchronization between mobile computing devices and enterprise computing systems regardless of a communication connection between the mobile computing devices and cloud computer system 120.

Cloud computer system 120 may further operate as an intermediary computing environment by communicating with different enterprise computing systems, some of which may have different communication protocols. Such communication protocols may be custom or specific to an application or service in communication with cloud computer system 120. Further, cloud computer system 120 may communicate with an enterprise computing system to send and receive enterprise data according to a format supported by the enterprise computing system. By having sufficient computing resources, cloud computer system 120 may communicate using communications for synchronizing enterprise data according to an enterprise computing system. Cloud computer system 120 may maintain local storage (e.g., local cache) of enterprise data and may use the local storage to manage synchronization of the enterprise data between mobile computing devices and enterprise computing systems 140.

Cloud computer system 120 may be implemented using hardware, software, firmware, or combinations thereof. For example, cloud computer system may include one or more computing devices, such as a server computer. Cloud computer system may include one or more memory storage devices and one or more processors. A memory storage device can be accessible to the processor(s) and can include instructions stored thereon which, when executed by the processor(s), cause the processor(s) to implement one or more operations disclosed herein. In some embodiments, the memory storage devices may operate as local storage (e.g., cache).

In certain embodiments, cloud computer system 120 may include or implement one or more adaptors, e.g., HCM adaptor 122, CRM adaptor 124, and adaptor 126. Each adaptor may support communication according to a specific communication protocol, a type of enterprise computing system, a type of application, a type of service, or combinations thereof. A communication protocol supported by an adaptor may be specific to one or more enterprise computing systems. For example, HCM adaptor 122 may be configured for communication according to a protocol supported by HCM enterprise computing system 134. Cloud computer system 120 may establish separate communication connections 128-132 with each of enterprise computing systems 140.

Cloud computer system 120 may be configured to communicate with enterprise computing systems 140 via one or more networks (not shown). Examples of communication networks may include the Internet, a mobile network, a public network, a wireless network, a cellular network, a local area network (LAN), a wide area network (WAN), other communication networks, or combinations thereof. In certain embodiments, communication connections 128-132 may be high speed communication connections facilitated using high speed communication trunks.

Mobile computing device 120 may be a computing system implemented in hardware, firmware, software, or combinations thereof. Mobile computing device 102 may communicate with any enterprise computing system 140 through cloud computer system 120. Mobile computing device 102 may include or may be implemented as an endpoint, a personal digital assistant (PDA), a tablet computer, a laptop computer, a desktop computer, a wearable computer, a pager, etc. Mobile computing device 102 may include one or more memory storage devices and one or more processors. Mobile computing device 102 may include different kinds of operating systems. A memory storage device may be accessible to the processor(s) and may include instructions stored thereon which, when executed by the processor(s), cause the processor(s) to implement one or more operations, methods, or processes disclosed herein. The memory storage may operate as local storage (e.g., cache 160). Local storage may be implemented using any type of persistent storage device, such as a memory storage device or other computer-readable storage medium. In some embodiments, local storage may include or implement databases 114 (e.g., a document database, a relational database, or other type of database), file stores, file systems 116, or a combination thereof. The local storage may store enterprise data. In certain embodiments, local storage may include policy information. Policy information may be obtained from cloud computer system 120. Policy information may be used to determine synchronization and/or storage of enterprise data.

In various embodiments, mobile computing device 102 may be configured to execute and operate one or more applications such as a web browser, a client application, a proprietary client application, or the like. For example, application 104 and application 108 may be operated on mobile computing device 102. The client applications may be accessible or operated via one or more network(s). Applications, such as application 104 may include a graphical user interface (GUI) 106 for operating application.

Mobile computing device 102 may communicate with cloud computer system 120 via one or more communication networks using wireless communication. Examples of communication networks may include a mobile network, a wireless network, a cellular network, a local area network (LAN), a wide area network (WAN), other wireless communication networks, or combinations thereof.

Mobile computing device 102 may include synchronization manager 110. Synchronization manager 110 may include an application programming interface (API) to enable applications, e.g., application 104, to request various operations related to access and use of enterprise data from enterprise computing systems. In some embodiments, applications may request synchronization manager 110 to manage synchronization of enterprise data. The API may provide callable functions, methods, operations, routines, or the like to manage and access enterprise data 362. Such callable functions may include functions for accessing information about policies and information about enterprise data 362 accessed from cache 360. Synchronization manager 110 may manage communications to cloud computer system 120 for applications. In certain embodiments, synchronization manager 110 may establish a communication connection 118 with cloud computer system 120 using a custom protocol (e.g., a custom sync protocol). The custom protocol may be an HTTP-based protocol. By enabling synchronization manager 110 to handle communication with cloud computer system 120, applications can avoid a burden of configuring communication with cloud computer system 120. By utilizing a custom protocol, synchronization manager 110 can operate on any mobile computing device platform to communicate with cloud computer system 120.

In certain embodiments, synchronization manager 110 may manage enterprise data locally and synchronize with cloud computer system 120 when possible. An application requesting enterprise data may be provided with a quick response from synchronization manager 110 if enterprise data can be retrieved locally. Enterprise data that is not available locally may be received from cloud computer system 120.

Cloud computer system 120 may store enterprise data retrieved for other applications or mobile computing devices. As a result, cloud computer system 120 may maintain a local copy of enterprise data for quick access or synchronization. Cloud computer system 120 may first search its local storage to locate enterprise data or perform synchronization for a request before communicating with enterprise computing systems. By doing so, cloud computer system 120 may be able to synchronize and retrieve enterprise data faster for mobile computing device 102. Cloud computer system 120 may be able to retrieve and/or synchronize enterprise data concurrently with communicating enterprise data to mobile computing device 102. In some embodiments, cloud computer system 120 may receive and/or synchronize enterprise data faster than enterprise data or results are communicated to mobile computing device 102. As such, cloud computer system 120 may store enterprise data or information related to synchronization before they are communicated to mobile computing device 102, thereby improving a response time for mobile computing devices to access enterprise data enterprise computing systems 140.

A cloud computer system may enable mobile computing devices to communicate with enterprise computing system despite difference in computing resources. A cloud computer system may be equipped with more resources and a faster, more reliable connection to enterprise computing systems to communicate frequently to receive enterprise data. The cloud computer system may manage and synchronize enterprise data to be communicated to mobile computing devices according to their communication capabilities. Further, by caching enterprise data at the cloud computer system, enterprise data may be easily retrieved and synchronized with a mobile computing device. The cloud computer system can manage synchronization independently from its communication with mobile computing devices.

Figure 2:
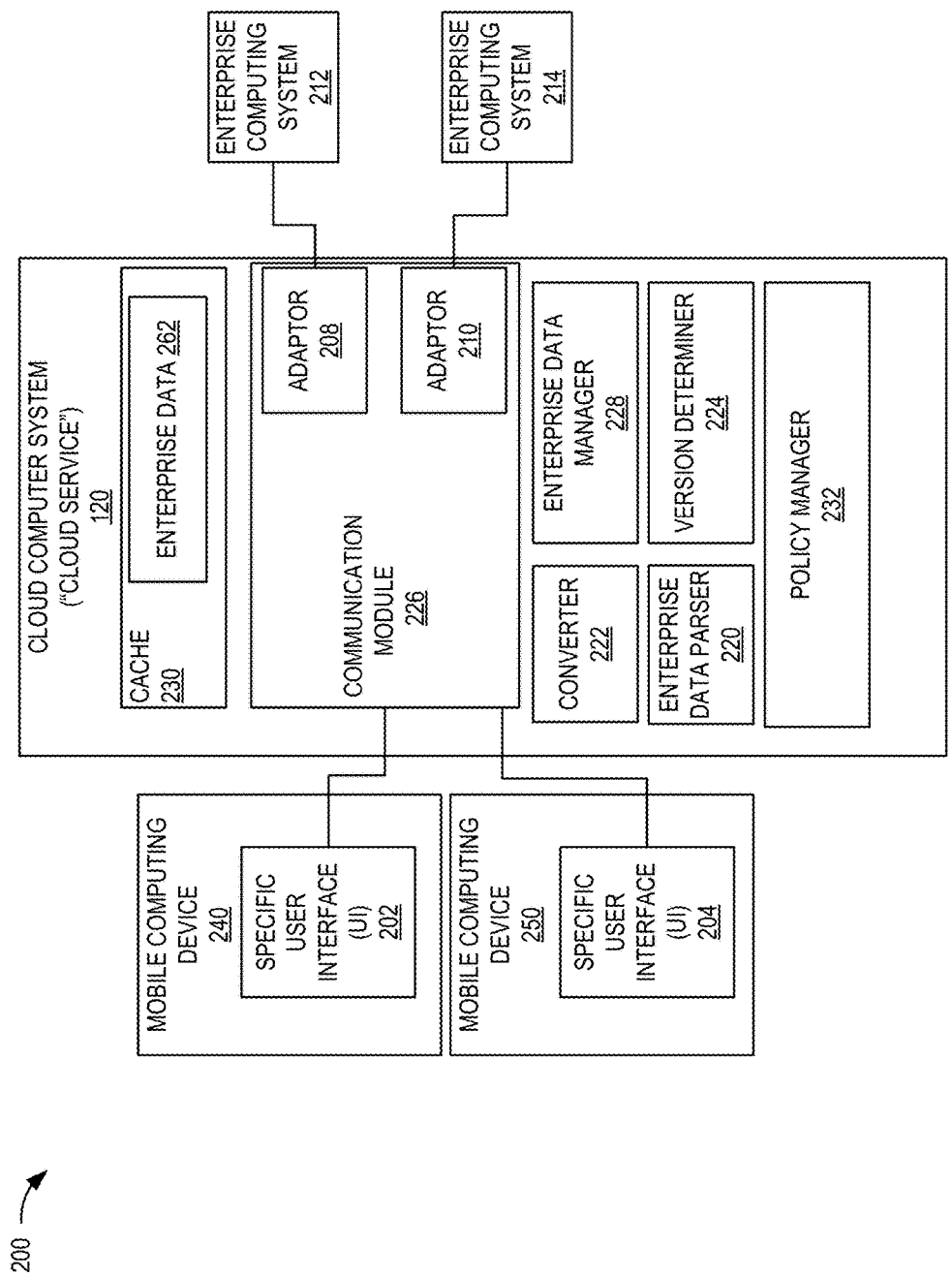
FIG. 2 shows a block diagram of a computer system for synchronizing enterprise data between enterprise computing systems and a mobile computing device according to some embodiments of the present invention.

FIG. 2 shows a block diagram of a computing system (e.g., cloud computer system 120) for synchronizing enterprise data between enterprise computing systems and mobile computing devices according to some embodiments of the present invention. In certain embodiments, cloud computer system 120 may be implemented as one or more functional block or modules configured to perform various operations for communication and/or synchronization of enterprise data communicated between mobile computing devices (e.g., a mobile computing device 240 and a mobile computing device 250) and enterprise computing systems (e.g., an enterprise computing system 212 and an enterprise computing system 214). Cloud computer system 120 may include an enterprise data parser 220, a converter 222, a version determiner 224, a communication module 226, an enterprise data manager 228, and a policy manager 232. Cloud computer system 120 may include one or more memory storage devices ("local storage"), such as cache 230. Cache 230 may be used to store enterprise data 262. Enterprise data 262 may be received from enterprise computing systems 212, 214 or from mobile computing devices 240, 250, or may include enterprise data converted by cloud computer system 120, or combinations thereof.

Communication module 226 may be configured to handle communications for cloud computer system 120 with multiple enterprise computing systems, e.g., enterprise computing systems 212, 214. Such enterprise computing systems may be physically located beyond a firewall of cloud computer system 120 at a different geographic location (e.g., remote geographic location) than cloud computer system 120. In some embodiments, enterprise computing system 212 may be different from enterprise computing system 214. In some embodiments, enterprise computing system 212 and enterprise computing systems 214 may be part of a single computing system. Each of enterprise computing systems 212, 214 may communicate with cloud computer system 120 using a different communication protocol.

In certain embodiments, one or more of enterprise computing systems 212, 214 may communicate with cloud computer system 120 using an HTTP-based protocol. In some embodiments, enterprise computing systems 212, 214 may communicate with cloud computer system 120 using a REST communication protocol. For example, REST protocol may support a formats including URI (uniform resource identifier) or URL (uniform resource locator). Data formatted for communication using REST protocol may be easily converted to data formats such as JSON, comma-separated values (CSV), and really simple syndication (RSS). Enterprise computing systems 212, 214 and cloud computer system 120 may communicate using other protocols such as remote procedure calls (RPC) (e.g., XML RPC).

As explained earlier, cloud computer system 120 and enterprise computing systems 212, 214 may communicate using communication connections that support high speed communication. The high speed communication connections may enable cloud computer system to maintain ongoing and multiple communications with enterprise computing systems to synchronize enterprise data. The high speed communication connections may afford cloud computer system 120 the ability to handle multiple communications with enterprise computing systems to fully synchronize enterprise data, whereas a mobile computing device may be limited in bandwidth of a wireless communication connection to constantly receive enterprise data. The communication connection between cloud computer system 120 and an enterprise computing system may be reliable such that cloud computer system 120 may receive and send communications to synchronize enterprise data with little or no interruption.

In certain embodiments, communication module 226 may communicate with enterprise computing systems 212, 214 to synchronize updated enterprise data. Communication module 226 may request enterprise computing systems for updates to enterprise data. Such requests may be prompted based on requests received from mobile computing devices 240, 250. In some embodiments, communication module 226 may receive updated enterprise data from enterprise computing systems 212, 214 without a request. Communication module 226 may send enterprise computing systems updates to enterprise data received from mobile computing devices 240, 250. The updates to the enterprise data may be determined by enterprise data manager 228, which is described below.

In some embodiments, communication module 226 may include one or more adaptors, e.g., adaptor 208 and adaptor 210. An adaptor may support communication according to a communication protocol, a type of enterprise computing system, a type of application, a type of service, or combinations thereof. A communication protocol supported by an adaptor may be specific to one or more enterprise computing systems. For example, communication module 226 may include an adaptor 208 configured for communication with enterprise computing system 212 using a specific protocol supported by enterprise computing system 212. In another example, communication module 226 may include an adaptor 210 configured for communication with enterprise computing system 214 using a specific protocol supported by enterprise computing system 214.

Cloud computer system 120 may use communication module 226 to communicate with mobile computing devices, e.g., mobile computing devices 240, 250. Mobile computing devices may be in a different geographical location than cloud computer system 120. For example, mobile computing devices 240, 250 may be physically located beyond a firewall of cloud computer system 120 at a different geographic location (e.g., remote geographic location) than cloud computer system 120. Each of mobile computing devices 240, 250 may communicate with cloud computer system 120 using a different communication protocol. In certain embodiments, one or more of mobile computing device 240, 250 may communicate with cloud computer system 120 using an HTTP-based communication protocol. In some embodiments, communication module 226 may communicate with mobile computing devices using a custom communication protocol. The custom communication protocol may be an HTTP-based communication protocol. The communication protocol used for communication between mobile computing devices 240, 250 may support communication of data structured in different formats (e.g., JSON format), which may be easily readable by mobile computing devices and cloud computer system 120.

In certain embodiments, mobile computing devices 240, 250 may be configured with specific user interfaces 202, 204 (UIs), respectively, to communicate with cloud computer system 120. A specific UI may be configured to communicate using a specific communication protocol. In some embodiments, specific UIs 202, 204 may include callable interfaces, functions, routines, methods, and/or operations that may be invoked to communicate with cloud computer system. Specific UIs 202, 204 may accept as input parameters for requesting or receiving enterprise data from enterprise computing systems 212, 214. Communication through a specific UI may be converted for communication using a custom communication protocol. In certain embodiments, specific UIs 202, 204 may be included or implemented by synchronization manager 110. In some embodiments, specific UIs 202, 204 may correspond to a custom client in an application.

Cloud computer system 120 may include components that can convert enterprise data to different formats and/or manage storage of enterprise data to maintain synchronization between mobile computing devices 240, 250 and enterprise computing systems 212, 214.

Enterprise data manager 228 may manage storage of enterprise data in local storage (e.g., cache 230) of cloud computer system 120. Managing enterprise data may include creating, reading, updating, and deleting the enterprise data in local storage. Enterprise data manager 228 may perform operations to search and retrieve enterprise data for an application or a service. In certain embodiments, enterprise data manager 228 may search its local storage for enterprise data that satisfies a query from a mobile computing device (e.g., mobile computing device 240). Enterprise data that can be found is sent to the mobile computing device. Enterprise data that doesn't exist in local storage may be requested from enterprise computing systems 212, 214.

In some embodiments, enterprise data manager 228 may store enterprise data formatted for distribution to a mobile computing device separately from enterprise data received from enterprise computing systems in a different format. Enterprise data may be stored based criteria such as version of enterprise data, type of application, type of service, type of enterprise computing system, users, mobile computing devices, content of enterprise data, data type (e.g., item, collection of items, or a blob), or combinations thereof. In certain embodiments, other information identified in enterprise data may be stored in local storage. For example, policy information corresponding to enterprise data may be stored locally. Further details about URIs and policy information are described below.

Enterprise data parser 220 may parse enterprise data received from enterprise computing systems 212, 214 in a variety of formats. In some embodiments, enterprise data 862 may be received in a format that may be unknown to an application on a mobile computing device. With many different enterprise computing systems, some being legacy enterprise computing systems, enterprise data may be received in different formats. For example, the enterprise data received from enterprise computing systems 212, 214 may be structured in a REST format corresponding to REST protocol. In certain embodiments, the enterprise data received from enterprise computing systems may use JSON format to structure content, e.g., items and collection of items. Enterprise data parser 220 may configured to parse enterprise data in the format in which it was received. Enterprise data parser 220 may parse the enterprise data to identify items, collection of items, and blobs. In some embodiments, enterprise data parser 220 may determine whether items are included in multiple collections.

In certain embodiments, enterprise data received from enterprise computing system 212, 214 may include policy information. The policy information may include a policy for each distinct piece of information in the enterprise data. As described further below, a distinct piece of information may correspond to an item. For example, policy information may include a policy corresponding to each contact information included in a list of contacts. In certain embodiments, enterprise data received from an enterprise computing system 212, 214 may include information (e.g., a URI) indicating a location of additional information about each distinct piece of information. Enterprise data parser 220 may be configured to parse enterprise data to identify a URI and/or corresponding policy information associated with portion of enterprise data corresponding to a distinct piece of information.

In certain embodiments, enterprise data manager 228 may determine whether enterprise data received from mobile computing devices 240, 250 includes updates to enterprise data for one or more enterprise computing systems 212, 214. Enterprise data manager 228 may compare a version of enterprise data received from mobile computing devices with enterprise data stored locally to determine whether enterprise data has been updated. In some embodiments, communication received from mobile computing devices may indicate whether enterprise data received from mobile computing devices includes updates. Version determiner 224 described below may provide information indicating a version of enterprise data and/or whether enterprise data has been updated based on the received enterprise data.

In certain embodiments, enterprise data manager 228 may manage updates to enterprise data received from mobile computing devices 240, 250 and enterprise computing systems 212, 214. For example, enterprise data manager 228 may merge enterprise data to maintain a current version of enterprise data. Data may be merged and updated based on an order in which enterprise data is updated, created, and deleted. Enterprise data updated or created by a mobile computing device may be communicated to enterprise computing systems. Enterprise data manager 228 may use a version of enterprise data to determine whether the enterprise data should be updated. Version determiner 224, described below, may be configured to determine a version of enterprise data. In certain embodiments, new enterprise data or updates to existing enterprise data may be communicated to mobile computing devices and enterprise computing systems for synchronization. In some embodiments, updated enterprise data may be communicated to mobile computing devices with a version to enable the mobile computing devices to maintain synchronization of the enterprise data for the updated items.

In some embodiments, enterprise data manager 228 may process requests for updated enterprise data. Requests may be received in a communication protocol used by synchronization manager 110. The requests may include commands, such as HTTP-based commands (e.g., Get, Put, Post, or Delete). The commands may include identifiers of items, collection of items, and/or BLOBs to be synchronized.

Requests for updated enterprise data may be received from mobile computing devices 240, 250. In certain embodiments, requests for updated enterprise data may include a version of the enterprise data. Enterprise data manager 228 may determine whether a version of enterprise data stored locally is different from a version indicated by the request. Enterprise data manager 228 may send updated enterprise data to mobile computing devices for items and collections of items that have changed. In certain embodiments, enterprise data manager 228 may send a BLOB corresponding to enterprise data requested by an application. A BLOB may include a portion of a larger BLOB. Enterprise data manager 228 may determine a portion of a BLOB that may be needed rather than an entire BLOB that may consume communication bandwidth and stored on a mobile computing device.

Enterprise data parser 220 may be configured to identify certain types of information within enterprise data. The types of information may include items, collection of items, and blobs. Enterprise data parser 220 may parse the enterprise data to identify types of information. In certain embodiments, enterprise data may be parsable to identify items, collection of items, and blobs. An item may include a piece of information that is distinguishable from other information. For example, enterprise data including contact information about multiple people may have data corresponding to contact information for each person. The enterprise data may be parsed to distinguish an item corresponding to a distinct contact information for each person. A collection of items may be identified by a relationship of the items identifiable the enterprise data. In some embodiments, a format of the enterprise data may be structured such that multiple items may be identified as a collection (e.g., a group) having a relationship. In certain embodiments, enterprise data parser 220 may parse enterprise data to identify BLOBs in enterprise data. BLOBs may be identified as enterprise data that is otherwise not identifiable or associated with an item or a collection of items. In some embodiments, enterprise data may be received in a REST data format such that a structure of the enterprise data may be known. Items may be identified by parsing the enterprise data according to the REST format. In some embodiments, enterprise data may be parsable based on URIs in the enterprise data, such that an item may be identified based on URIs.

In certain embodiments, enterprise data may include information indicating a version of information corresponding to the types of information identified in the enterprise data. Version determiner 224 may perform processing on enterprise data corresponding to identified types of information to identify the version. In some embodiments, upon identification of types of information in enterprise data, version determiner 224 may compare the identified information, such as items, collection of items, and/or blobs to locally stored enterprise data to determine whether any data has changed.

Upon identification of types of information in enterprise data, enterprise data manager 228 may store the identified information in local storage of cloud computer system 120. Version information for enterprise data may be stored with the enterprise data to update and manage current version of enterprise data. The version information may enable enterprise data manager 228 to determine a current version and whether updates should be communicated to either or both of mobile computing devices 240, 250 and enterprise computing systems 212, 214.

Converter 222 may convert enterprise data in one format to another different format. For example, converter 222 may enterprise data received in one format (e.g., a REST data format) to another format (e.g., JSON format) that may be readable by mobile computing devices 240, 250, and vice versa. Enterprise data received from enterprise computing systems 212, 214 may be converted before being processed to determine contents of enterprise data. In certain embodiments, conversion to a format (e.g., JSON format) readable by the mobile computing device, except when already in such a format, may enable enterprise data parser 220 to identify content of enterprise data. In some embodiments, enterprise data communicated between mobile computing devices and enterprise computing systems may not be converted when enterprise data is parsable (e.g., able to be parsed) by both parties. Converter 222 may convert enterprise data that is updated from a previous version.

In some embodiments, converter 222 may insert an identifier (e.g., an entity tag) into the converter enterprise data to identify an item, a collection of items, and blobs. During conversion of enterprise data from a format used by an enterprise computing system to a format used by mobile computing devices, converter 222 may insert an identifier for each item in enterprise data. Converter 222 may insert version information indicating a version of the item. The version information may be determined by the version determiner 224. The identifiers and the version information may be included in updated enterprise data to enable mobile computing device to synchronize enterprise data with its locally stored enterprise data.

Cloud computer system 120 may include policy manager 232. Policy manager 232 may manage synchronization of enterprise data based on policy information associated with the enterprise data. Policy information may be stored with enterprise data in local storage. Policy information may indicate criteria for storage and synchronization of enterprise data. In certain embodiments, policy manger 232 may determine a manner for synchronizing enterprise data with mobile computing devices. For example, policy manager 232 may instruct enterprise data manager 228 on how to provide enterprise data, including updated enterprise data, to mobile computing devices based on classification of a communication connection (e.g., data transfer rate, type of communication, or the like) of each mobile computing device to a wireless network.

A cloud computer system may facilitate communication of enterprise data between mobile computing devices and enterprise computing systems. By handling translation of protocols used to communicate enterprise data, applications on mobile computing devices may obtain enterprise data from a wide variety of enterprise computing systems. By identifying distinct information (e.g., items, collection of items, and blobs) in enterprise data, the cloud computer system can minimize duplicate enterprise data related between groups of information. Further identification of distinct information enables the cloud computer system to manage delivery of enterprise data to those items, collection of items, and BLOBs that have changed or need to be updated based on policy information. The identification of distinct information enables applications to easily identify distinct information, which can be used for subsequent search and retrieval.

Figure 3:
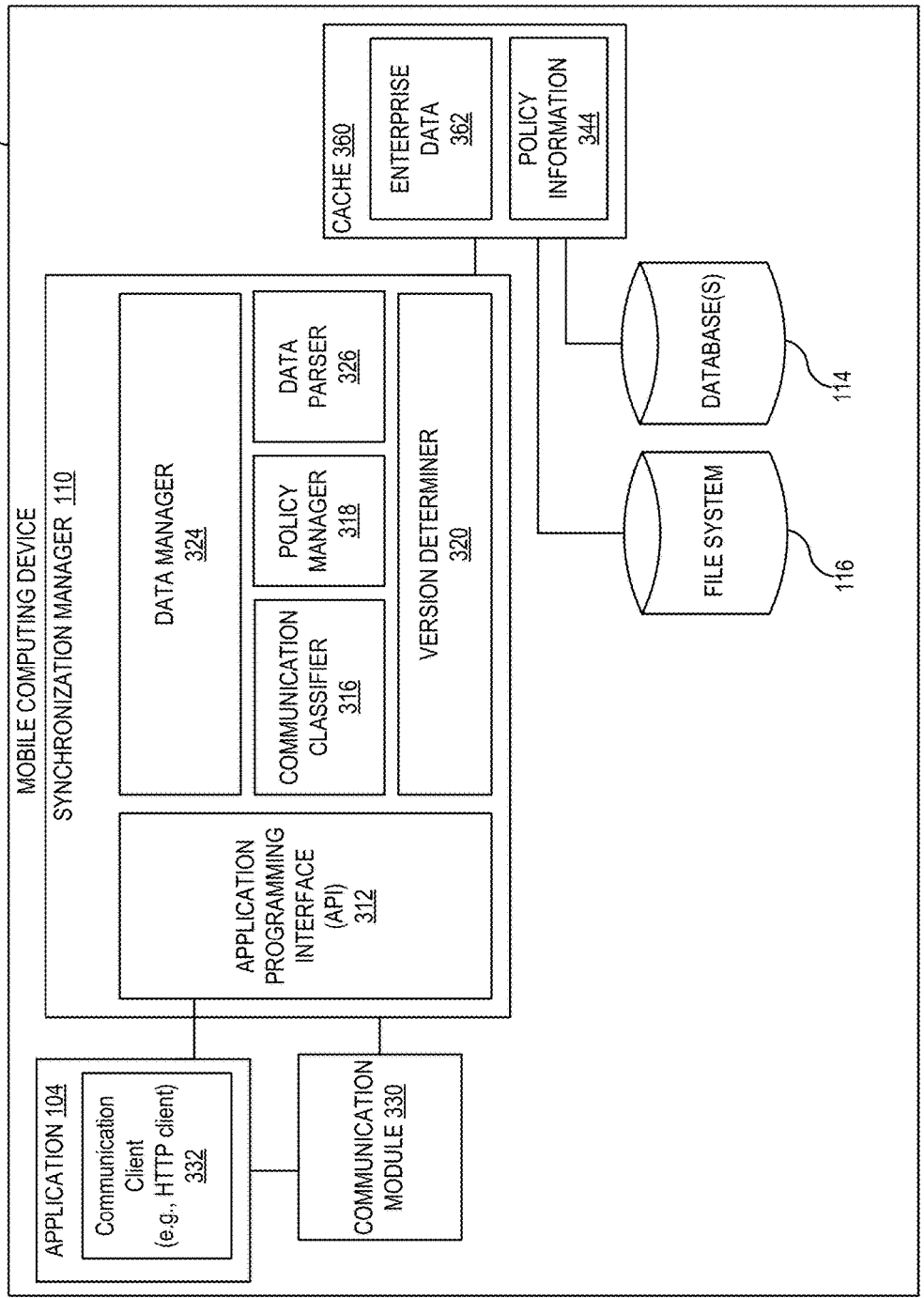
FIG. 3 shows a block diagram of a mobile computing device for synchronizing enterprise data with enterprise computing systems according to some embodiments of the present invention.

FIG. 3 shows a block diagram of a computing system (e.g., cloud computer system 120) for synchronizing enterprise data between different types of enterprise computing systems and mobile computing devices according to some embodiments of the present invention. Mobile computing device 102 may be implemented as one or more functional block or modules configured to perform various operations for communication and/or synchronization of enterprise data with enterprise computing systems (e.g., enterprise computing systems 140) via cloud computer system 120.

Mobile computing device 102 may include synchronization manager 110 and communication module 330. Communication module 330 may be configured for communication with cloud computer server 120. Synchronization manager 110 may include or implement a software development kit (SDK). The SDK may provide an interface for communication with cloud computer server 120 and for handling management of enterprise data for an application. The SDK may provide a common interface that may be used by different applications and/or different mobile computing devices. Irrespective of communication protocols supported by enterprise computing systems, synchronization manager 110 may manage synchronization of enterprise data with cloud computer system 120. Enterprise data may be synchronized by cloud computer system 120 between use by applications on mobile computing devices and changes at enterprise computing systems.

Synchronization manager 110 may include an application programming interface (API) 312 to enable applications, e.g., application 104, to request various operations related to access and use of enterprise data from enterprise computing systems. All or a portion of synchronization manager 110 may be implemented in application 104. In some embodiments, applications may call the API of the synchronization manager 110 to manage synchronization of enterprise data. The API may be extended such that applications may perform operations related to enterprise data using the synchronization manager 110. API 312 may provide callable functions, methods, operations, routines, or the like to manage and access enterprise data 362. Such callable functions may include functions for accessing information about policies and information about enterprise data 362 accessed from cache 360. The API 312 may enable an application to request enterprise data from enterprise computing systems via cloud computer system 120. The API 312 may receive information, such as parameters for requesting or updating enterprise data. In some embodiments, cache 360 may include local storage such as database 114 and/or file system 116.

Synchronization manager 110 may include a communication classifier 316, a policy manager 318, a version determiner 320, a search module 322, a data manager 324, and a data parser 326. Mobile computing device may include one or more memory storage devices ("local storage"), such as cache 360. Cache 360 may be used to store enterprise data 362. Enterprise data 362 may be received from cloud computer system 120. Cache 360 may store offline enterprise data 362 that has been created or that has been updated by an application. Policy information may be included with enterprise data 362. In some embodiments, mobile computing device may include database(s) 114 that store policy information 344. The policy information 344 may be based on policy information included with enterprise data 362. The policy information 344 may be formatted in a markup language format (e.g., XML format). The policy information 344 may indicate criteria for storing and/or using enterprise data. The policy information may include criteria based on communication connections. Such criteria may be used to indicating rules for caching.

In certain embodiments, an application, e.g., application 104, executing on mobile computing device 102 may communicate requests to cloud computer system 120. Mobile computing device 102 may include communication module 330 configured to establish a communication connection with cloud computer system 120 via a network. In some embodiments, application 104 may include a communication client 332 to communicate requests according to a communication protocol. Communication client 332 may be used to communicate requests and receive responses with cloud computer system 120 via a network. Communication client 332 may include an HTTP client to communicate HTTP requests using an HTTP-protocol. In some embodiments, communication client 332 may use a custom communication client, which may be configured for use by different types of applications, services, and mobile computing devices. By using a communication protocol accessible to applications on different mobile computing devices, cloud computer system 120 may communicate with different applications without having to communicate using different communication protocols. Application 104 may communicate with cloud computer system 120 by communicating requests through communication client 332. In some embodiments, application 104 may request, through API 312, synchronization manager 110 to perform operations, which may include communicating with cloud computer system 120 via communication client 332. In some embodiments, requests communicated through communication client 332 may be intercepted by synchronization manager 110 to perform processing for the request before communicating a request to cloud computer system 120.

As explained above, enterprise data 362 may be received in a format that may be readable by different applications on mobile computing devices. In some embodiments, enterprise data may be in a format, such as a JSON format, which may be easily parsable by many types of applications. Data parser 326 may perform operations to parse enterprise data. Enterprise data received from cloud computer system 120 may be formatted according to a format that is different from a format of the enterprise data when received from enterprise computing systems. In some embodiments, enterprise data may be formatted such that certain types of data may be identifiable. For example, enterprise data may be formatted as a particular type of data, either an item, a collection of items, or a blob. Data parser 326 may parse enterprise data to identify items, collections of items, and/or blobs. In some embodiments, data parser 326 may be identify these enterprise data having these data types based on an identifier (e.g., an entity tag) inserted in enterprise data corresponding to enterprise data for each instance of an identified type.

Data manager 324 may manage enterprise data for applications. Applications, e.g., application 104 may communicate a request through communication client 332 for enterprise data corresponding to an application. Data manager 324 may perform operations including creating, reading, updating, and/or deleting enterprise data. Such operations may be performed in response to a request by an application for enterprise data. Data manager 324 may store enterprise data 362 in cache 360. Identified data types may have a corresponding URI, which may be included in enterprise data. The URI may be used to locate information corresponding to an item. An item may include URI's or other information identifying other items. Other items may be stored in cache 360. Data manager 324 can request enterprise data for items. To consume less storage on cache 360 to store enterprise data, data manager 324 may store a single copy of enterprise data corresponding to an item referenced by other items or included in a collection of items. In certain embodiments, data manager 324 may perform a search on cache 360 to determine whether requested enterprise data exists, and if so, provides the enterprise data to the application. However, when enterprise data does not exist, synchronization manager 110 may initiate a request to cloud computer system 120. For other types of requests, such as updating, creating, or deleting enterprise data, data manager may determine whether such operations can be performed. If necessary, data manager 324 may initiate a request to cloud computer system 120 to perform a request.

Version determiner 320 may determine a version of enterprise data, such as a version of each item, collection of items, and/or blobs discovered in enterprise data. In certain embodiments, each item, collection of items, or blob identified in enterprise data may include a version of the corresponding enterprise data. The version of the enterprise data may correspond to a version of the enterprise data synchronized with an enterprise computing system. The version may be used to synchronize enterprise data from an application. In some embodiments, information about a version of enterprise data may be indicated by an identifier (e.g., entity tag) in an item, a collection of items, or blobs in enterprise data.

Data manager 324 may store version information indicating a version of enterprise data. Items, collections of items, and/or blobs may be stored in association with version information. Data manager 324 may update a version of enterprise data as it is updated or may assign a new version when enterprise data is created. When communication module 330 can establish a communication with cloud computer system 120, enterprise data that has been updated, deleted, or created may be communicated to cloud computer system 120 to be synchronized with an enterprise computing system. Version information may be provided with enterprise data corresponding to items, collections of items, and/or blobs that are communicated for synchronization. As explained above, cloud computer system 120 may maintain a synchronized version of enterprise data. The enterprise data may be maintained based on each distinct instance of an application or each distinct mobile computing device that receives enterprise data. The version information may enable cloud computer system 120 to determine an order for updating enterprise data that has been changed by another application or an enterprise computing system.

Data manager 324 may request updates to enterprise data from cloud computer system 120 to synchronize enterprise data 362 stored in cache 360. In some embodiments, data manager 324 may communicate version information with a request for updates to stored enterprise data 362. The version information may correspond to items, collections of items, and/or blobs identified in enterprise data 362. Cloud computer system 120 may use the version information to determine which items to synchronize. Enterprise data corresponding to items and blobs that have an updated version may be received from cloud computer system 120. In some embodiments, enterprise data corresponding to collections may be received to indicate updates to collections of items.

Policy manager 318 may manage policy information corresponding to enterprise data 326. Policy manager 318 may store policy information 344 in local storage. In some embodiments, policy information 344 may be stored in a formatted file, such as an XML file. Policy information 344 may be received from cloud computer system 120 with enterprise data. In some embodiments, enterprise data may include policy information 344.

As explained earlier, policy information 344 may indicate criteria for storing enterprise data. Such criteria may be based on a type of application using enterprise data or a type of enterprise data (e.g., an item, a collection of items, or a blob). For example, enterprise data corresponding to sensitive data (e.g., person information, medical information, financial information, or the like) may be associated with a policy that indicates that the enterprise data is to be stored during an active session of an application and to be removed when an application is terminated. In another example, non-sensitive information like news and non-private information may remain stored in cache 360 across different sessions of an applications. Policy information 344 may indicate criteria for updating enterprise data associated with a policy. For enterprise data, such as news, which may change frequently, criteria in policy information 344 may indicate that that enterprise data can be updated regularly according to a periodic schedule.

Sync SDK 110 can read policy XML file 112 to determine how it should cache data given different connection speeds. For example, if a user changes an item of a collection, the item can be uploaded to sync service 120 based on there being a medium connection and based on there being only one item of the collection edited by the user. The policy can determine the action based on the classification of the current connection speed and the policy.

In certain embodiments, criteria in policy information 344 may be related to communication connection from a mobile computing device. The criteria based on communication connection may include data transfer rate, types of communication connections, other criteria based on a communication connection, or combinations thereof.

Other criteria in policy information may include conditions for storing and accessing enterprise data. For example, policy information 344 may indicate criteria for storing enterprise data based on a status of an application (e.g., restarting or terminating) or an expiration time. The expiration time may be based on when an application terminates or restarts or based on whether policy information can be located in cache 360. In another example, policy information 344 may indicate conditions when policy information is to be updated by requesting cloud computer system 120 for updates. In some instances, policy information 344 may be updated based on when a mobile computing device has a communication connection to cloud computer system 120 or when policy information could not be retrieved.

Data manager 324 may determine enterprise data 362 to updated based policy information corresponding to enterprise data 362, specifically each item, collection of items, or blob identified in enterprise data 362. In some embodiments, API 312 may include a callable interface to request policy information for enterprise data. API 312 may provide callable routines that can determine policy information 344 including criteria for updating policy information and expiration of policy information. In some embodiments, permission to update policy information 344 may be restricted based on the type of enterprise data, a type of an application accessing the enterprise data, or other criteria related to content of enterprise data.

Data manager 324 may determine whether to synchronize (e.g., update) enterprise data 362 based on policy information 344 corresponding to enterprise data 362. For policy information 344 that indicates criteria related to a communication connection, data manager 324 may determine whether to update enterprise data based on classification of communication between mobile computing device 102 and cloud computer system 120. For example, when a data transfer rate satisfies a communication connection threshold indicated by the policy, enterprise data may be updated. Other criteria may be defined based on classification of a communication connection.

Communication classifier 316 may determine information about a communication connection between mobile computing device 102 and cloud computer system 120. The information may be used by data manager to determine whether criteria based on a communication connection are satisfied for a policy. Communication classifier 316 may obtain information about the communication connection from communication module 330. For example, communication classifier 316 may classify a current connection speed of mobile computing device 102. The current connection data transfer rate can be classified as high, medium, or low, depending on normal functions. For example, a current connection data transfer rate greater than 1 MB/sec. bandwidth may be considered "high," a data transfer rate ranging from 500 kB/sec to 1 MB/sec. may be considered "medium," and a data transfer rate less than 500 kB/sec. may be considered slow. In some embodiments, communication classifier 316 can determine transfer rates as percentages of the highest nominal transfer rate. For example, if the highest transfer rate is 1 MB/sec (100%), then medium transfer rates can be considered in the range of 25% to 75%, and low transfer rates are anything below 25%. In another example, communication classifier 316 may classify a communication connection based on a type of connection (e.g., 4G, 3G, Wi-Fi, nonexistent, or other).

Figure 4:
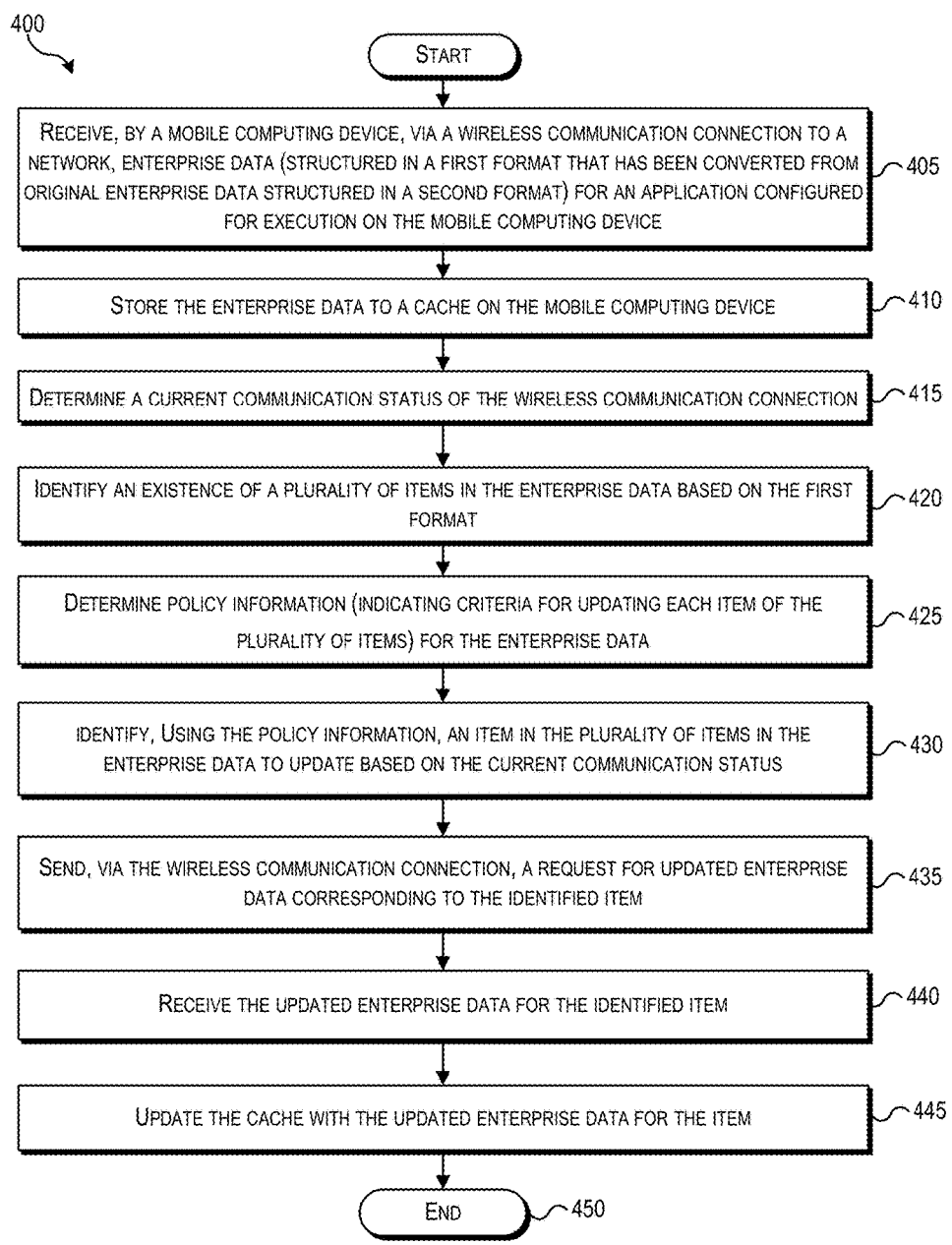
FIG. 4 is a flowchart illustrating a process of synchronizing enterprise data between a mobile computing device and an enterprise computing system according to some embodiments of the present invention.

FIG. 4 is a flowchart illustrating a process 400 of synchronizing enterprise data between a mobile computing device and an enterprise computing system according to some embodiments of the present invention. Specifically, process 400 enables a mobile computing device (e.g., a mobile smartphone) to synchronize enterprise data for an enterprise computing system by sending a request to a cloud computer system (e.g., a cloud service) for updated enterprise data. In certain embodiments, a request for updated enterprise data may be communicated based on policy information for each item or a collection of items. As explained above, policy information may be associated with the enterprise data, such as items and a collection of items. Policy information may indicate a policy (e.g., criteria) for updating an item or a collection of items including a time and a manner for updating the item. In certain embodiments, policy information may indicate criteria for updating item(s), such as a communication connection, such that items may be updated in a certain manner based on a type of communication connection. Based on such criteria, process 400 may determine items for which a request should be made to obtain updated information. In certain embodiments, a mobile computing device, e.g., mobile computing device 102 of FIG. 1, may implement process 400.

Beginning at block 405, process 400 may include receiving, via a wireless communication connection to a network, enterprise data for an application configured for execution on the mobile computing device. For example, mobile computing device 102 may receive enterprise data from cloud computer system 120 via a wireless communication connection to a network. The enterprise data may be used by the application 104 on mobile computing device 102. The enterprise data may be structured in one format that may have been converted from another format. The format of the enterprise data before conversion may be different from the format after conversion. For example, the enterprise data may be in a format (e.g., a REST protocol format) when received from one of enterprise computing systems 140. The enterprise data may be converted by cloud computer system 120 to a format (e.g., JSON format) that can be easily read by a variety of applications on a mobile computing device. At block 410, process 400 may include storing the enterprise data to a cache (e.g., cache 160) on the mobile computing device (e.g., mobile computing device 102).

At block 415, process 400 may include determining a current communication status of the wireless communication connection. For example, process 400 may determine a communication status of a current communication connection between mobile computing device 102 and cloud computer system 120. The communication status may include a rate of data communication, a bandwidth of data communication, whether the communication connection is active, or a combination thereof. In some embodiments, process 400 may determine a type of communication connection between mobile computing device 102 and cloud computer system 120.

At block 420, process 400 may include identifying an existence of a plurality of items in the enterprise data based on a format to which the enterprise data is converted before being received by process 400. As explained above, the format may be a JSON format. In some embodiments, enterprise data may have a format such that items may be identified by parsing the enterprise data. The enterprise data may be formatted such that items are identifiable corresponding to an application that will use the enterprise data. For example, the enterprise data may be formatted such that it contains multiple items, each item corresponding to a contact information of a person. The enterprise data may be parsed to identify an existence of a plurality of items. The application using the enterprise data may be configured to parse the enterprise data to determine items in the enterprise data.

At block 425, process 400 may include determining policy information for the enterprise data. The policy information may indicate policies for managing (e.g., updating, storing, or reading) the enterprise data. The policy information may be determined for each item identified in the enterprise data. The policy information may indicate a policy for each item that is identified in the enterprise data. In some embodiments, the policy information may be received separately from the enterprise data. The enterprise data may indicate where to locate the policy information. In some embodiments, the policy information may indicate items to which policies may apply.

In certain embodiments, the policy information indicates criteria for updating, storing, and/or deleting enterprise data corresponding to the item. For example, the policy information may indicate types of applications that may access the enterprise data. In another example, the policy information may indicate a length of time to store the enterprise data corresponding to an item. Other examples of the policy information may include a time period for updating an item. In certain embodiments, the policy information may indicate criteria that are based at least in part on a communication status of a communication connection. For example, the policy information may indicate a manner for updating the items based on the communication status. When a communication connection between a mobile computing device and a cloud computer system has a certain status (e.g., data transfer rate or type of connection), certain items may be updated. Items that may be updated may correspond to a type of application, a type of enterprise data, or other criteria related to the enterprise data. Although embodiments and examples are described with reference to items, the policy information may indicate policies applicable to collection of items or other types of information identified in enterprise data.

At block 430, process 400 may include using the policy information to identify an item in the plurality of items in the enterprise data to update based on the current communication status. An item may be updated by sending a request to a cloud computer system (e.g., cloud computer system 120) to receive an update to the item. As explained above, the policy information may indicate a policy for managing an item in the enterprise data. The policy may indicate a frequency at which an item is to be updated. Based on such frequency, items may be identified to be updated. The policy may indicate criteria, such as a current communication status, based on which an item is to be updated. For example, the policy information may indicate a policy for updating an item based on when a communication status of a wireless communication connection between a mobile computing device (e.g., mobile computing device 102) and a cloud computer system (e.g., cloud computer system 120) satisfies a particular threshold data transfer rate (e.g., 3G or 4G communication). The communication status, such as a threshold data transfer rate, indicated by a policy may ensure that an adequate bandwidth exists for receiving updates to an item.

At block 435, process 400 may include sending a request for updated enterprise data corresponding to the identified item. For example, mobile computing device 102 may send a request to cloud computer system 120 for updated enterprise data corresponding to the identified item. In some embodiments, the request may indicate a version of the item, with which cloud computer system 120 may use to determine whether updated enterprise data corresponding to the item exists. In some embodiments, the request may include enterprise data updated for the item offline, such as on a mobile computing device.

At block 440, process 400 may include receiving updated enterprise data for an item identified to be updated based on policy information. Updated enterprise may be received from a cloud computer system. The cloud computer system may send an update upon receiving a request for updated enterprise data for an item. The updated enterprise data may be sent upon determining that a version of enterprise data corresponding to the item stored at the mobile computing device is not current. In some embodiments, the updated enterprise data may include changes to enterprise data for an item, rather than all enterprise data corresponding to the item.

At block 445, process 400 may include updating cache with the updated enterprise data for the identified item. For example, cache on a mobile computing device (e.g., cache 160 of mobile computing device 102) may be updated using the updated enterprise data received from cloud computer system. In some embodiments, the cache may be updated with the portions of the enterprise data corresponding to the item that has changed. The process ends at block 450.

It will be appreciated that process 400 is illustrative and that variations and modifications are possible. Steps described as sequential may be executed in parallel, order of steps may be varied, and steps may be modified, combined, added or omitted. In certain embodiments, process 400 may be implemented when enterprise data is received via a wireless communication connection to a network. For example, process 400 may be performed when enterprise data is received from a cloud computer system (e.g., cloud computer system 120) via a wireless communication connection to a network. It should be noted that process 400 can be performed concurrently for enterprise data that is received in multiple communications via a wireless communication connection to a network. In certain embodiments, blocks 415-445 may be implemented to update enterprise data stored on cache of a mobile computing device. In certain embodiments, blocks 430-445 may be implemented when items are identified to be updated based on a current communication status of a wireless communication connection to a network. Further, blocks 440 and 445 may be implemented to update cache on a mobile computing device with updated enterprise data is received for an item.

Figure 5:
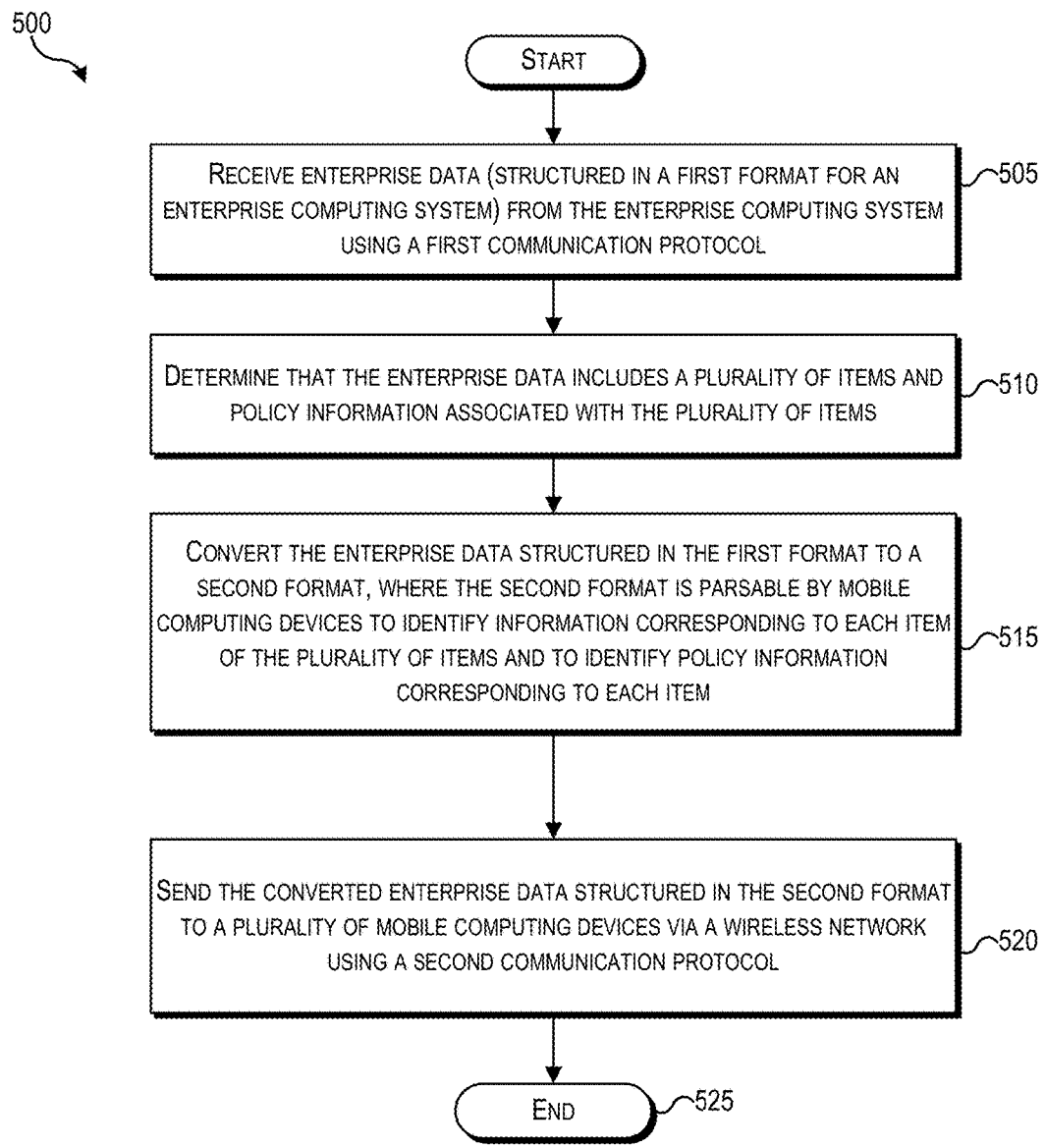
FIG. 5 is a flowchart illustrating a process of synchronizing enterprise data between a mobile computing device and an enterprise computing system according to some embodiments of the present invention.

FIG. 5 is a flowchart illustrating a process 500 of synchronizing enterprise data between a mobile computing device and an enterprise computing system according to some embodiments of the present invention. Specifically, process 500 enables a cloud computer system (e.g., cloud computer system 120) to synchronize enterprise data between an enterprise computing system and mobile computing devices. In certain embodiments, a cloud computer system (e.g., cloud computer system 120) may implement process 500.

Beginning at block 505, process 500 may include receiving enterprise data from an enterprise computing system via a network communication connection using a communication protocol. For example, cloud computer system 120 may receive enterprise data from enterprise computing system 134 using a communication protocol (e.g. a REST communication protocol). The enterprise data may be structured in a format (e.g., a REST data format) for the enterprise computing system. The cloud computer system and the enterprise computing system may be located at different geographical locations.

At block 510, process 500 may include determining that the enterprise data includes a plurality of items and policy information associated with the plurality of items. For example, cloud computer system 120 may parse the enterprise data to identify items in the enterprise data. In some embodiments, the enterprise data may include policy information for each identified item.

At block 515, process 500 may include converting the enterprise data structured in the one format, in which the enterprise data was received, to a different format. Enterprise data in the converted format may be parsable by mobile computing devices to identify enterprise data corresponding to each item of the plurality of items. The enterprise data in the converted format may be parsable to identify policy information corresponding to each item identified in the enterprise data. For example, the different format may be a JSON format that can be easily parsed by mobile computing devices without having awareness of different communication protocols such as the communication protocol used for communication with enterprise computing systems.

At block 520, process 500 may include sending the converted enterprise data in the converted format to a plurality of mobile computing devices via a wireless network. The converted enterprise data may be sent using a communication protocol that supports the converted format.

It will be appreciated that process 500 is illustrative and that variations and modifications are possible. Steps described as sequential may be executed in parallel, order of steps may be varied, and steps may be modified, combined, added or omitted. In certain embodiments, process 500 may be implemented when enterprise data is received from an enterprise computing system.

Figure 6:
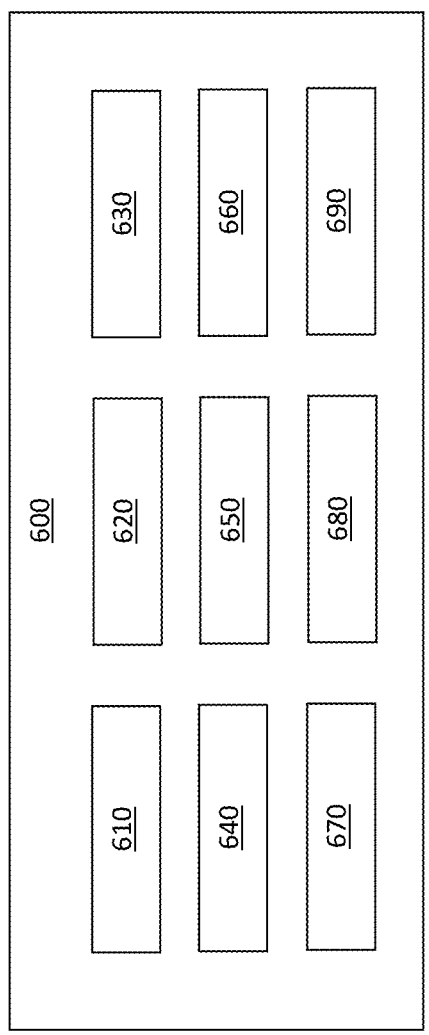
FIG. 6 illustrates a functional block diagram of a mobile computing device, in which various embodiments of the present invention may be implemented.
Figure 7:
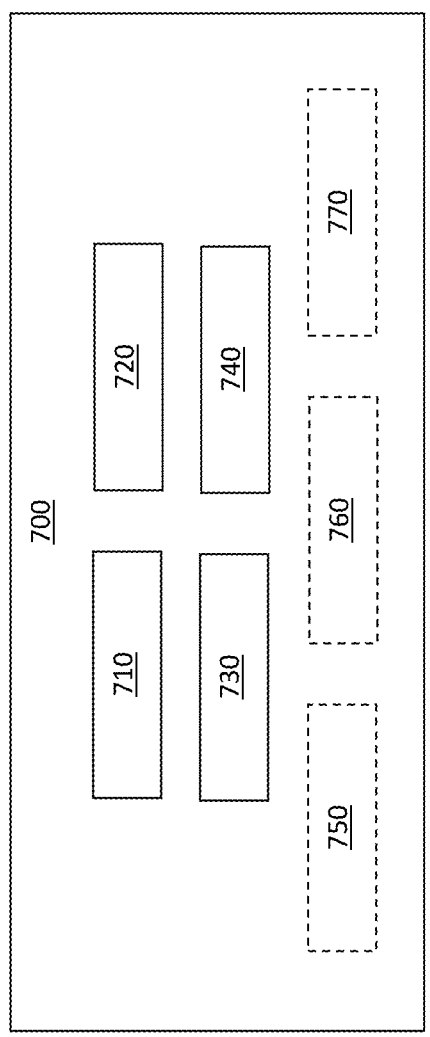
FIG. 7 illustrates a functional block diagram of a cloud computer system, in which various embodiments of the present invention may be implemented.

FIG. 6 illustrates a functional block diagram of a mobile computing device, in which various embodiments of the present invention may be implemented, and FIG. 7 illustrates a functional block diagram of a cloud computer system, in which various embodiments of the present invention may be implemented. The functional blocks of the mobile computing device and the cloud computer system may be implemented by hardware, software, or a combination of hardware and software to carry out the principles of the invention. It is understood by persons of skill in the art that the functional blocks described in FIGS. 6 and 7 may be combined or separated into sub-blocks to implement the principles of the invention as described above. Therefore, the description herein may support any possible combination or separation or further definition of the functional blocks described herein.

Referring to FIG. 6, the mobile computing device 600 may be provided for synchronizing enterprise data with enterprise computing systems (not shown). The mobile computing device 600 may comprise a first receiving unit 610, a storing unit 620, a first determining unit 630, a first identifying unit 640, a second determining unit 650, a second identifying unit 660, a sending unit 670, a second receiving unit 680, and an updating unit 690.

The first receiving unit 610 may receive, via a wireless communication connection to a network, enterprise data for an application configured for execution on the mobile computing device. The enterprise data may be structured in a first format that has been converted from original enterprise data structured in a second format. The storing unit 620 may store the enterprise data to a cache on the mobile computing device 600. The first determining unit 630 may determine a current communication status of the wireless communication connection. The first identifying unit 640 may identify an existence of a plurality of items in the enterprise data based on the first format. The second determining unit 650 may determine policy information for the enterprise data. The policy information may indicate criteria for updating each item of the plurality of items, and the criteria are based at least in part on a communication status of a communication connection. The second identifying unit 660 may identify, using the policy information, an item in the plurality of items in the enterprise data to update based on the current communication status. The sending unit 670 may send, via the wireless communication connection, a request for updated enterprise data corresponding to the identified item. The second receiving unit 680 may receive the updated enterprise data for the identified item. The updating unit 690 may update the cache with the updated enterprise data for the identified item. In one embodiment, the received enterprise data is structured in a JavaScript Object Notation format. In one embodiment, the enterprise data is received from an enterprise server through a cloud computer system; the enterprise data is structured in a format when it is received; and the format is based on conversion of the enterprise data structured in a REST format. In one embodiment, an item in the enterprise data includes a uniform resource identifier, and the uniform resource identifier indicates a location of information about the item. In one embodiment, the enterprise data includes a first collection of items and a second collection of items, and the first collection of items and the second collection of items include a first item. In one embodiment, the enterprise data includes information indicating whether the enterprise data includes an item, a collection of items, or a blob. In one embodiment, the current communication status is based on a data transfer rate of the wireless communication connection between the mobile computing device 600 and the network. In one embodiment, the request indicates version information associated with the identified item, and the updated enterprise data is determined based on the version information. In one embodiment, the enterprise data includes items; the policy indicates a time period for storing the items in the cache; and the time period is based on content included in the items. In one embodiment, the enterprise data stored in the cache includes items, and the policy indicates a time period for updating each of the items.

Referring to FIG. 7, a cloud computer system 700 may be provided for synchronizing enterprise data between mobile computing devices and enterprise computing systems. The cloud computer system 700 may comprise a receiving unit 710, a first determining unit 720, a converting unit 730, and a sending unit 740.

The receiving unit 710 may receive enterprise data from an enterprise computing system (not shown) via a network communication connection using a first communication protocol. The enterprise data may be structured in a first format for the enterprise computing system. The cloud computer system 700 and the enterprise computing system may be located at different geographical locations. The first determining unit 720 may determine that the enterprise data includes a plurality of items and policy information associated with the plurality of items. The converting unit 730 may convert the enterprise data structured in the first format to a second format. The second format is parsable by mobile computing devices to identify enterprise data corresponding to each item of the plurality of items and to identify policy information corresponding to each item. The sending unit 740 may send the converted enterprise data structured in the second format to a plurality of mobile computing devices via a wireless network using a second communication protocol. In one embodiment, the first communication protocol is a REST protocol, and the second communication protocol is different from the first communication protocol. In one embodiment, the enterprise data structured in the first format is in a representation state transfer (REST) format. In one embodiment, the cloud computer system 700 may further comprise a storing unit 750. The storing unit 750 may store an identifier in enterprise data corresponding to each of the items. The identifier identifies the item. In one embodiment, the cloud computer system 700 may further comprise an identifying unit 760 and a second determining unit 770. The identifying unit 760 may identify at least two collection of items in the plurality of items. The second determining unit 770 may determine that an item is included in at least two collection of items. Converting the enterprise data from the first format to the second format may include inserting additional information to the enterprise data that is converted, and the addition information identifies each collection of items.

Figure 8:
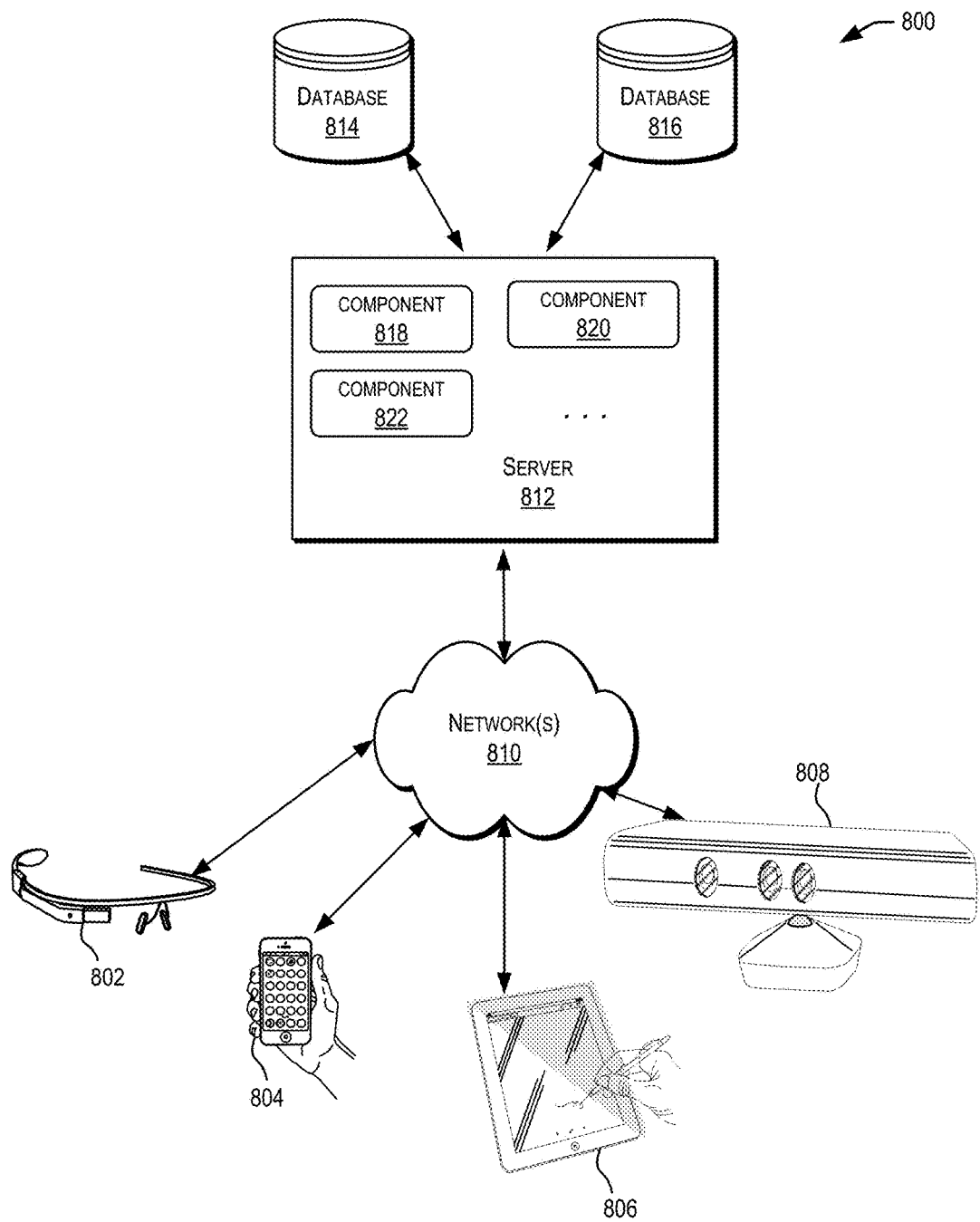
FIG. 8 depicts a simplified diagram of a distributed system for implementing one of the embodiments.

FIG. 8 depicts a simplified diagram of a distributed system 800 for implementing one of the embodiments. The distributed system 800 can implement all or some elements of computer system 100, all or some elements of computer system 200, all or some elements of computer system 300, or a combination thereof. The distributed system 800 can implement operations, methods, and/or processes (e.g., process 400 of FIG. 4 or process 500 of FIG. 5). In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. In certain embodiments, the one or more client computing devices 802-808 can include mobile computing device 102 of FIG. 1. Server 812 may be communicatively coupled with remote client computing devices 802, 804, 806, and 808 via network 810. The server 812 can include mobile computing device 102 or cloud computer system 120.

In various embodiments, server 812 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIXO servers, mid-range servers, mainframe computers, rack-mounted servers, etc.), server farms, server clusters, or any other appropriate arrangement and/or combination. Server 812 can include one or more virtual machines running virtual operating systems, or other computing architectures involving virtualization. One or more flexible pools of logical storage devices can be virtualized to maintain virtual storage devices for the server. Virtual networks can be controlled by server 812 using software defined networking. In various embodiments, server 812 may be adapted to run one or more services or software applications described in the foregoing disclosure. For example, server 812 may correspond to a server for performing processing described above according to an embodiment of the present invention.

Server 812 may run an operating system including any of those discussed above, as well as any commercially available server operating system. Server 812 may also run any of a variety of additional server applications and/or mid-tier applications, including HTTP servers, FTP servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands. The one or more databases 814 and 816 can include or be implemented as database 114.

Figure 9:
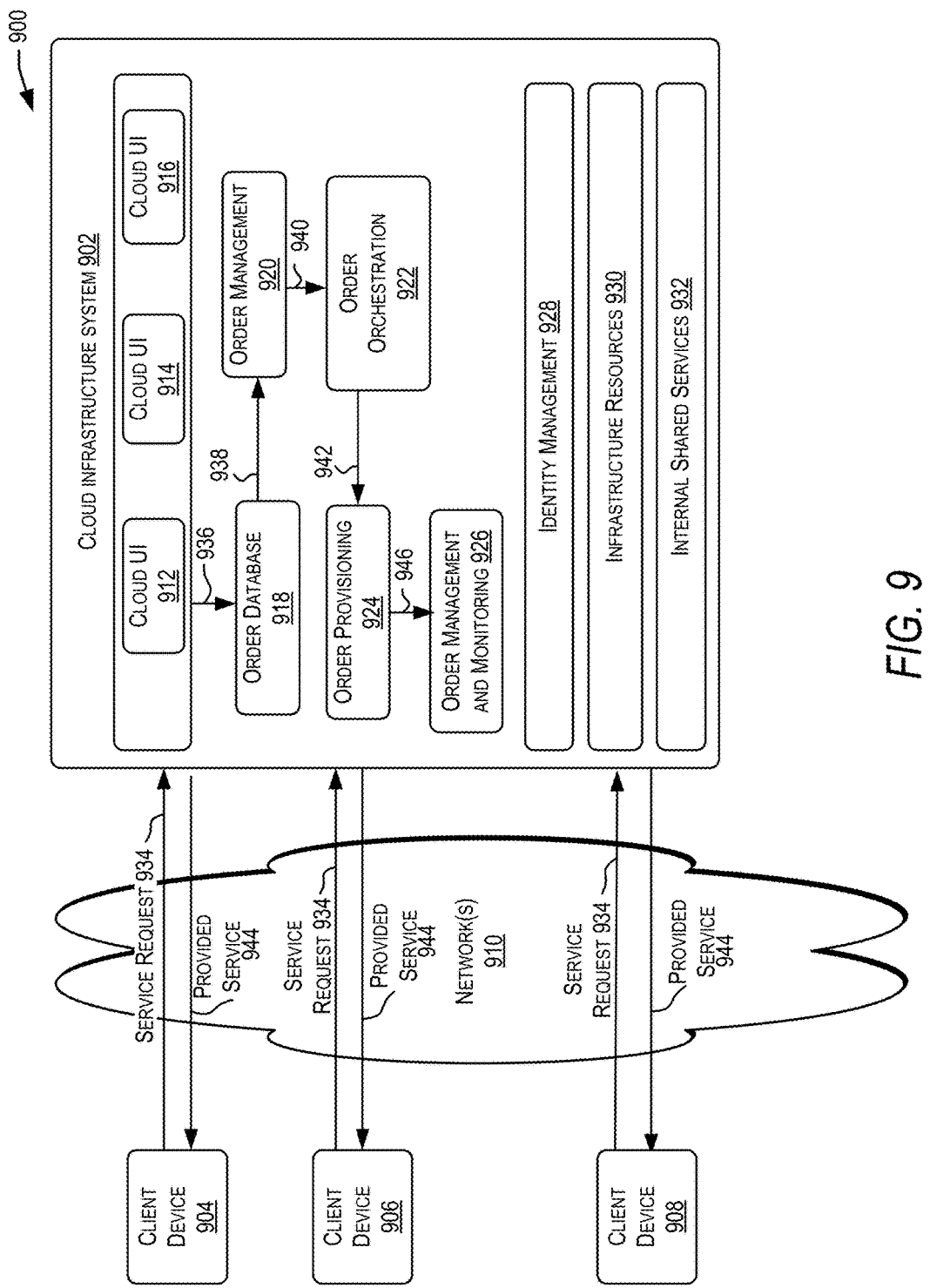
FIG. 9 shows a simplified block diagram of components of a system environment by which services provided by the components of an embodiment system may be offered as cloud services, in accordance with an embodiment of the present disclosure.

FIG. 9 is a simplified block diagram of one or more components of a system environment 900 by which services provided by one or more components of an embodiment system may be offered as cloud services, in accordance with an embodiment of the present invention. The system environment 900 can include or implement all or some elements of computer system 100, all or some elements of computer system 200, all or some elements of computer system 300, or a combination thereof. The system environment 900 can implement operations, methods, and/or processes (e.g., process 400 of FIG. 4 or process 500 of FIG. 5). In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. For example, the cloud infrastructure system 902 can include or implement cloud computer system 120. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve enterprise data, structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.). Identity management module 928 may also include the management of descriptive information about each customer and about how and by whom that descriptive information can be accessed and modified.

Figure 10:
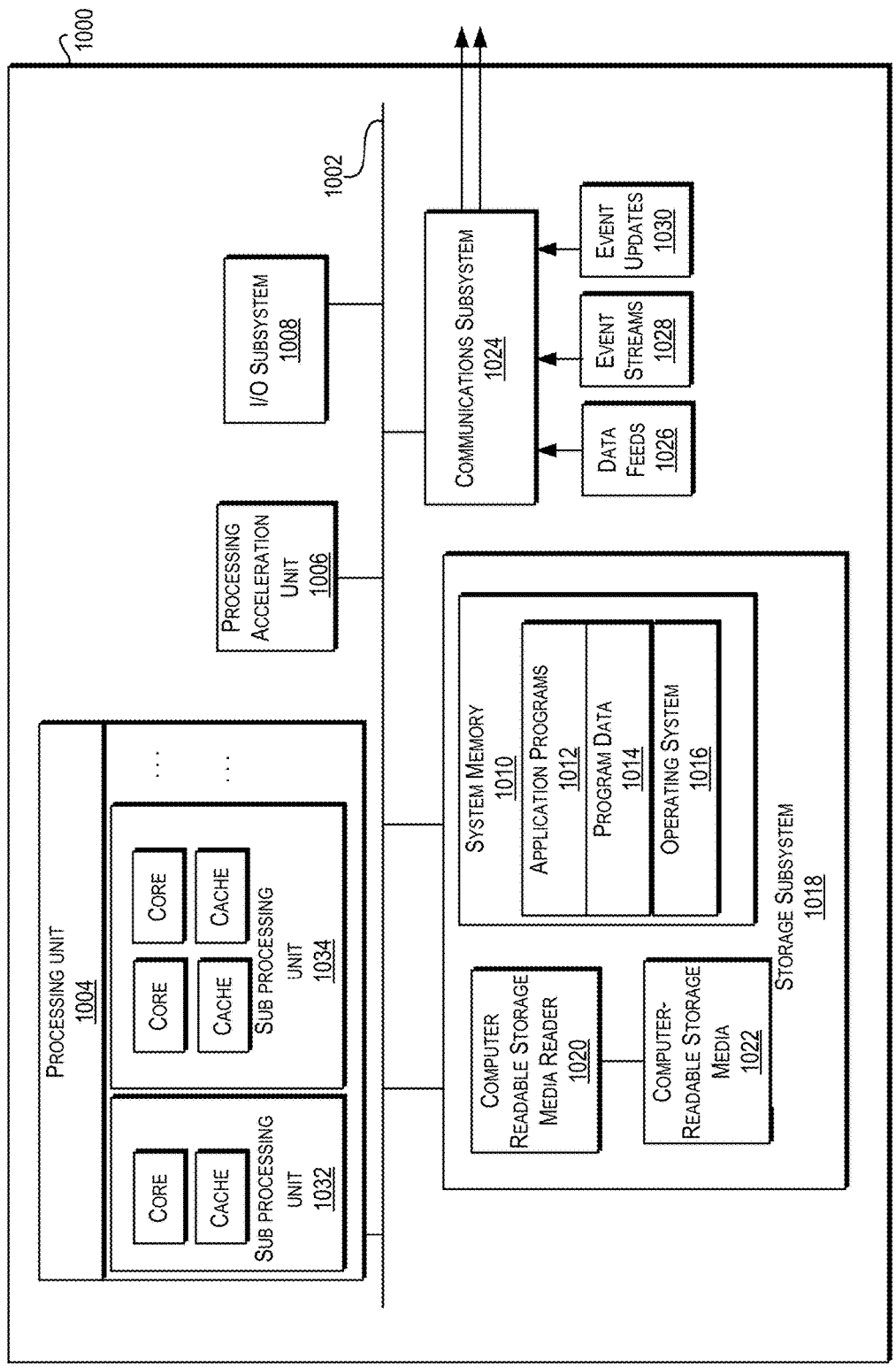
FIG. 10 illustrates an exemplary computer system, in which various embodiments of the present invention may be implemented.

FIG. 10 illustrates an exemplary computer system 1000, in which various embodiments of the present invention may be implemented. The system 1000 may be used to implement any of the computer systems described above. For example, all or some elements of computer system 100, all or some elements of computer system 200, all or some elements of computer system 300, or combinations thereof can be included or implemented in the system 1000. The system 1000 can implement operations, methods, and/or processes (e.g., process 400 of FIG. 4 or process 500 of FIG. 5). As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1002.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, embodiments of the invention are described with reference to specific embodiments thereof, but those skilled in the art will recognize that the invention is not limited thereto. Various features and embodiments of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method of synchronizing data for an application on a mobile device from a computer system of an enterprise, the method comprising:

receiving, by a mobile computing device, via a wireless communication connection of the mobile computing device to a network, from a first computer system of an intermediary system in communication with a second computer system of an enterprise system, enterprise data for an application configured for execution on the mobile computing device, wherein the enterprise data is structured in a first format that has been converted from original enterprise data structured in a second format for the second computer system, and wherein the enterprise data structured in the first format comprises a plurality of data items, each data item in the plurality of data items comprising an identifier tag indicating a version of the data item;

storing, by the mobile computing device, the enterprise data to a cache on the mobile computing device;

determining, by the mobile computing device, a current communication status of the wireless communication connection of the mobile computing device to the network, wherein the current communication status includes a current measure of data communication for the wireless communication connection between the mobile computing device and the network;

parsing, by the mobile computing device, the enterprise data to identify each of the plurality of data items using the identifier tag;

determining, by the mobile computing device, policy information of a policy for updating the enterprise data based on the current communication status of the wireless communication connection, wherein the policy information is determined using policy data included in the enterprise data received from the first computer system, wherein the policy information defines a threshold for communication based on one or more criteria for obtaining one or more updates from the first computer system for each data item of the plurality of data items, and wherein the one or more criteria include a measure of data communication for a wireless communication connection of the mobile computing device to one or more networks;

identifying, using the policy information, by the mobile computing device, a set of data items in the plurality of data items in the enterprise data for which to obtain an update from the second computer system via the first computer system based on determining that the one or more criteria including the measure of data communication for the wireless communication connection of the mobile computing device is satisfied by the current communication status of the mobile computing device;

determining, using the policy information and the current communication status of the mobile computing device, a process for requesting the first computer system for an update to the set of data items identified according to the update from the second computer system, wherein the process defines a count of data items to include in each request to the first computer system for the update to the set of data items, and wherein the count of data items defined for the process is determined based on the current measure of data communication for the wireless communication connection between the mobile computing device and the network;

based on the set of data items identified for the update and based on the process for requesting the first computer system for the update to the set of data items, sending, by the mobile computing device, via the wireless communication connection of the mobile computing device to the network, to the second computer system through the first computer system, one or more requests for updated enterprise data for the update corresponding to the identified set of data items, the one or more requests comprising the version of each of the identified set of data items;

receiving, by the mobile computing device, from the second computer system through the first computer system, the updated enterprise data for the update to the identified set of data items based at least in part on the version of each of the identified set of data items; and updating, by the mobile computing device, the cache with the updated enterprise data for the identified set of data items.

2. The method of claim 1, wherein the first format of the received enterprise data is structured in a JavaScript Object Notation format.

3. The method of claim 1, wherein the enterprise data is received from the second computer system through the first computer system, and wherein the first format of the received enterprise data is based on conversion of the enterprise data structured in the second format that is a representation state transfer (REST) format.

4. The method of claim 1, wherein the identifier tags further comprise a data type for each of the plurality of data items, wherein the parsing the enterprise data further identifies a plurality of uniform resource identifiers using the data type for each of the plurality of data items, and wherein each uniform resource identifier of the plurality of uniform resource identifiers indicates a location of information about the associated data item.

5. The method of claim 1, wherein the enterprise data includes a first collection of data items and a second collection of data items, and wherein the first collection of data items and the second collection of data items include a first data item.

6. The method of claim 1, wherein the enterprise data includes information indicating whether the enterprise data includes one or more data items, a collection of data items, or a blob.

7. The method of claim 1, wherein the current measure of data communication is a data transfer rate of the wireless communication connection between the mobile computing device and the network.

8. The method of claim 1, wherein the one or more requests comprises changes to at least one of the plurality of data items.

9. The method of claim 1, wherein the policy information indicates a time period for storing at least one of the plurality of data items in the cache, and wherein the time period is based on content included in the at least one of the plurality of data items.

10. The method of claim 1, wherein the policy information indicates a time period for updating each of the plurality of data items.

11. A system of a mobile computing device, the system comprising:

one or more processors; and one or more memory devices accessible to the one or more processors, the one or more memory devices storing one or more instructions which, upon execution by the one or more processors, causes the one or more processors to:

receive, via a wireless communication connection of the mobile computing device to a network, from a first computer system of an intermediary system in communication with a second computer system of an enterprise system, enterprise data for an application configured for execution on the mobile computing device, wherein the enterprise data is structured in a first format that has been converted from original enterprise data structured in a second format for the second computer system, and wherein the enterprise data structured in the first format comprises a plurality of data items, each data item in the plurality of data items comprising an identifier tag indicating a version of the data item;

store the enterprise data to a cache on the mobile computing device;

determine a current communication status of the wireless communication connection of the mobile computing device to the network, wherein the current communication status includes a current measure of data communication for the wireless communication connection between the mobile computing device and the network;

parsing the enterprise data to identify each of the plurality of data items using the identifier tag;

determine policy information of a policy for updating the enterprise data based on the current communication status of the wireless communication connection, wherein the policy information is determined using policy data included in the enterprise data received from the first computer system, wherein the policy information defines a threshold for communication based on one or more criteria for obtaining one or more updates from the first computer system for each data item of the plurality of data items, and wherein the one or more criteria include a measure of data communication for a wireless communication connection of the mobile computing device to one or more networks;

identify, using the policy information, by the mobile computing device, a set of data items in the plurality of data items in the enterprise data for which to obtain an update from the second computer system via the first computer system based on determining that the one or more criteria including the measure of data communication for the wireless communication connection of the mobile computing device is satisfied by the current communication status of the mobile computing device;

determine, using the policy information and the current communication status of the mobile computing device, a process for requesting the first computer system for an update to the set of data items identified according to the update from the second computer system, wherein the process defines a count of data items to include in each request to the first computer system for the update to the set of data items, and wherein the count of data items defined for the process is determined based on the current measure of data communication for the wireless communication connection between the mobile computing device and the network;

based on the set of data items identified for the update and based on the process for requesting the first computer system for the update to the set of data items, send, via the wireless communication connection of the mobile computing device to the network, to the second computer system through the first computer system, one or more requests for updated enterprise data for the update corresponding to the identified set of data items, the one or more requests comprising the version of each of the identified set of data items;

receive, from the second computer system through the first computer system, the updated enterprise data for the update to the identified set of data items based at least in part on the version of each of the identified set of data items; and update the cache with the updated enterprise data for the identified set of data items.

12. The system of claim 11, wherein the enterprise data is received from the second computer system through the first computer system, and wherein the first format of the received enterprise data is based on conversion of the enterprise data structured in the second format that is a representation state transfer (REST) format.

13. The system of claim 11, wherein the one or more requests comprises changes to at least one of the plurality of data items.

14. The system of claim 11, wherein the policy information indicates a time period for storing at least one of the plurality of data items in the cache, and wherein the time period is based on content included in the at least one of the plurality of data items.

15. The method of claim 1, wherein the intermediary system is a cloud computer system, and wherein the first computer system is distinct from the second computer system.

16. A non-transitory computer-readable storage medium storing one or more instructions which, upon execution by one or more processors, causes the one or more processors to:

receive, by a mobile computing device, via a wireless communication connection of the mobile computing device to a network, from a first computer system of an intermediary system in communication with a second computer system of an enterprise system, enterprise data for an application configured for execution on the mobile computing device, wherein the enterprise data is structured in a first format that has been converted from original enterprise data structured in a second format for the second computer system, and wherein the enterprise data structured in the first format comprises a plurality of data items, each data item in the plurality of data items comprising an identifier tag indicating a version of the data item;

store, by the mobile computing device, the enterprise data to a cache on the mobile computing device;

determine, by the mobile computing device, a current communication status of the wireless communication connection of the mobile computing device to the network, wherein the current communication status includes a current measure of data communication for the wireless communication connection between the mobile computing device and the network;

parse, by the mobile computing device, the enterprise data to identify each of the plurality of data items using the identifier tag;

determine, by the mobile computing device, policy information of a policy for updating the enterprise data based on the current communication status of the wireless communication connection, wherein the policy information is determined using policy data included in the enterprise data received from the first computer system, wherein the policy information defines a threshold for communication based on one or more criteria for obtaining one or more updates from the first computer system for each data item of the plurality of data items, and wherein the one or more criteria include a measure of data communication for a wireless communication connection of the mobile computing device to one or more networks;

identify, using the policy information, by the mobile computing device, a set of data items in the plurality of data items in the enterprise data for which to obtain an update from the second computer system via the first computer system based on determining that the one or more criteria including the measure of data communication for the wireless communication connection of the mobile computing device is satisfied by the current communication status of the mobile computing device;

determine, using the policy information and the current communication status of the mobile computing device, a process for requesting the first computer system for an update to the set of data items identified according to the update from the second computer system, wherein the process defines a count of data items to include in each request to the first computer system for the update to the set of data items, and wherein the count of data items defined for the process is determined based on the current measure of data communication for the wireless communication connection between the mobile computing device and the network;

based on the set of data items identified for the update and based on the process for requesting the first computer system for the update to the set of data items, send, by the mobile computing device, via the wireless communication connection of the mobile computing device to the network, to the second computer system through the first computer system, one or more requests for updated enterprise data for the update corresponding to the identified set of data items, the one or more requests comprising the version of each of the identified set of data items;
receive, by the mobile computing device, from the second computer system through the first computer system, the updated enterprise data for the update to the identified set of data items based at least in part on the version of each of the identified set of data items; and
update, by the mobile computing device, the cache with the updated enterprise data for the identified set of data items.

* * * * *

UNITED STATES PATENT AND TRADEMARK OFFICE
CERTIFICATE OF CORRECTION

PATENT NO. : 10,055,423 B2
APPLICATION NO. : 14/314729
DATED : August 21, 2018
INVENTOR(S) : Sagar et al.

Page 1 of 1

It is certified that error appears in the above-identified patent and that said Letters Patent is hereby corrected as shown below:

In the Specification

In Column 11, Line 62, delete "For" and insert -- for --, therefor.

In Column 24, Line 20, delete "that that" and insert -- that --, therefor.

Signed and Sealed this
Ninth Day of July, 2019

Andrei Iancu
*Director of the United States Patent and Trademark Office*